US010696212B2

(12) United States Patent
Cook

(10) Patent No.: US 10,696,212 B2
(45) Date of Patent: Jun. 30, 2020

(54) HELMET LIGHTING SYSTEM AND RELATED METHOD FOR MONITORING VEHICLE STATUS

(71) Applicant: Jeffrey B. Cook, San Diego, CA (US)

(72) Inventor: Jeffrey B. Cook, San Diego, CA (US)

( * ) Notice: Subject to any disclaimer, the term of this patent is extended or adjusted under 35 U.S.C. 154(b) by 0 days.

(21) Appl. No.: 16/397,088

(22) Filed: Apr. 29, 2019

(65) Prior Publication Data

US 2019/0248275 A1    Aug. 15, 2019

Related U.S. Application Data

(63) Continuation-in-part of application No. 15/860,277, filed on Jan. 2, 2018.

(60) Provisional application No. 62/445,799, filed on Jan. 13, 2017.

(51) Int. Cl.
| | | |
|---|---|---|
| *B60Q 1/50* | (2006.01) | |
| *B60Q 1/46* | (2006.01) | |
| *B60Q 1/26* | (2006.01) | |
| *A42B 3/04* | (2006.01) | |
| *B62K 23/06* | (2006.01) | |
| *B62L 3/02* | (2006.01) | |
| *B62J 6/04* | (2020.01) | |
| *B62J 6/05* | (2020.01) | |
| *B62J 6/015* | (2020.01) | |
| *B62J 6/165* | (2020.01) | |

(52) U.S. Cl.
CPC .......... *B60Q 1/2676* (2013.01); *A42B 3/0453* (2013.01); *B62J 6/015* (2020.02); *B62J 6/04* (2013.01); *B62J 6/05* (2020.02); *B62K 23/06* (2013.01); *B62L 3/02* (2013.01); *B60Q 2900/30* (2013.01); *B62J 6/165* (2020.02)

(58) Field of Classification Search
CPC ................................................... B60Q 1/2676
See application file for complete search history.

(56) References Cited

U.S. PATENT DOCUMENTS

| | | |
|---|---|---|
| 4,891,736 A | 1/1990 | Gouda |
| 5,426,792 A | 6/1995 | Murasko |
| 5,720,870 A | 2/1998 | Hahn et al. |
| 6,406,168 B1 | 6/2002 | Whiting |
| 6,914,520 B2 | 7/2005 | Chung |
| 6,933,836 B2 | 8/2005 | Hsu |
| 7,109,857 B2 | 9/2006 | Ross, Jr. et al. |
| 7,218,214 B2 | 5/2007 | Werner et al. |
| 7,455,139 B2 | 11/2008 | Lee |
| 7,556,412 B2 | 7/2009 | Guillermo |
| 7,667,586 B2 | 2/2010 | Cheng |
| 7,932,817 B2 | 4/2011 | Chen |
| 7,948,367 B1 | 5/2011 | Arauza |
| 8,009,031 B2 | 8/2011 | Pacheco et al. |
| 8,083,365 B2 | 12/2011 | Cohen et al. |
| 8,334,762 B2 | 12/2012 | Szeljack |

(Continued)

*Primary Examiner* — Joseph H Feild
*Assistant Examiner* — Pameshanand Mahase
(74) *Attorney, Agent, or Firm* — Kelly & Kelley, LLP

(57) ABSTRACT

A method for monitoring a vehicle status includes detecting a status of the vehicle, a helmet for the vehicle, or a component of the vehicle. A signal is transmitted wirelessly to a portable handheld device providing the notification to the user of the status of the vehicle, helmet, or vehicle component. Vehicle safety notifications and other information may also be relayed to the user through a software application operating on the handheld device.

12 Claims, 22 Drawing Sheets

(56) References Cited

U.S. PATENT DOCUMENTS

| | | | |
|---|---|---|---|
| 8,562,166 | B1 | 10/2013 | Kutnyak |
| 8,789,988 | B2 | 7/2014 | Goldwater |
| 9,457,709 | B2 | 10/2016 | Alataas |
| 9,603,403 | B2 | 3/2017 | Boutte |
| 9,781,958 | B2 | 10/2017 | Lau |
| 2004/0004827 | A1 | 1/2004 | Guest |
| 2004/0083040 | A1* | 4/2004 | Parrott .................. G07C 5/085 701/29.6 |
| 2006/0028349 | A1 | 2/2006 | Hsu |
| 2007/0063831 | A1 | 3/2007 | Perkins et al. |
| 2007/0285221 | A1 | 12/2007 | Howe et al. |
| 2009/0140847 | A1 | 6/2009 | Yen et al. |
| 2009/0325612 | A1* | 12/2009 | Oesterling .............. H04W 4/14 455/466 |
| 2010/0134272 | A1 | 6/2010 | Palacios |
| 2010/0207758 | A1* | 8/2010 | Szeljack .............. A42B 3/0453 340/475 |
| 2013/0077290 | A1 | 3/2013 | Huihui |
| 2013/0144471 | A1* | 6/2013 | Min ........................ G06F 17/00 701/2 |
| 2014/0277844 | A1* | 9/2014 | Luke ...................... G07C 5/008 701/2 |
| 2015/0022663 | A1* | 1/2015 | Wang .................. B60R 25/102 348/148 |
| 2015/0158417 | A1 | 6/2015 | Levi |
| 2015/0173666 | A1 | 6/2015 | Smith et al. |
| 2016/0357188 | A1* | 12/2016 | Ansari ................. G05D 1/0212 |
| 2017/0029056 | A1 | 2/2017 | Applegate |

\* cited by examiner

HELMET LIGHTING SYSTEM AND RELATED METHOD FOR MONITORING VEHICLE STATUS

RELATED APPLICATIONS

This is a Continuation-in-Part of U.S. application Ser. No. 15/860,277, filed Jan. 2, 2018, which claims the benefit of U.S. Provisional Application No. 62/445,799, filed on Jan. 13, 2017.

FIELD OF THE INVENTION

The present invention relates generally to vehicle safety systems. More particularly, the present invention relates to a helmet lighting system which illuminates as a warning to those behind a motorcycle as the motorcycle slows down or changes directions, and a method for monitoring a status of aspects of the vehicle, helmet, etc.

BACKGROUND OF THE INVENTION

It has long been required for motor vehicles to be equipped with illuminated brake and turn signals operable to warn other drivers on the road about a driver's intentions. Additionally, in motor vehicles, the use of center high mounted stop lights (CHMSL) has become pervasive. CHMSLs are characterized by stop lamps positioned at driver eye level and placed in or near the rear window of the motor vehicle. It is now well recognized that positioning stop lamps at eye level and directly in the field of view on the driver of a tailing vehicle results in a reduction in accidents.

Motorcycles are typically characterized by two-wheel vehicles that are also equipped with illuminated brake and turn signals to warn other drivers on the road about the motorcycle driver's intentions. However, motorcycles offer little crash protection to the operator and due to their size and narrow width when viewed from the rear, motorcycles are known for escaping notice by inattentive or multitasking automotive and truck drivers on roads and highways. A typical motorcycle frame construction does not offer the option of mounting a stoplight and turn signal at eye level on the frame of the motorcycle.

Rear end vehicle collisions are currently the most common vehicle collisions in the United States with well over two and a half million reported each year. In a rear end collision, the energy from the trailing vehicle is transferred to the front vehicle, propelling it forward. When the front vehicle is a motorcycle and the rear vehicle is a relatively massive automobile or truck, the results are obviously tragic. In such an instance, at the minimum, a motorcycle rider may be dislodged from the motorcycle, which leaves the rider's body momentarily suspended in the air and unprotected against an oncoming vehicle and the eventual abrasion of the pavement below.

Accordingly, it would be desirable to provide a convenient system for illuminating at least a portion of a motorcycle helmet, particularly as brake lights or turn signals are actuated. Although there have been many attempts to provide such helmet lighting systems in the past, many tend to be unduly bulky, expensive to install and use, and thus have not yet found widespread acceptance.

Moreover, many motorcycle riders delight in adding various forms of decorations to their vehicles and/or riding attire including helmets. It would be highly desirable to be able to incorporate such decorative elements into safety features discussed above in an economical and easy to use system. Such would tend to encourage more widespread use of such safety lighting systems by motorcycle riders. It would also be helpful to a motorcyclist to have real-time information relating to the status of the motorcycle, including various component parts thereof, the helmet, and motorcycle itself so as to maintain these components in a proper working state, prevent theft and the like.

The present invention fulfills these needs and provides other related advantages.

SUMMARY OF THE INVENTION

The present invention is directed to a helmet lighting system in which a display that is attached to a helmet, typically a rear portion of the helmet, is selectively illuminated in response to the motorcycle operator's application of the brakes or direction signal lights. As such, the helmet lighting system of the present invention mounts a stoplight and/or turn signal at eye level of drivers behind the motorcyclist.

The helmet lighting system of the present invention generally comprises a wireless transmitter operably coupled to a brake or direction signal lights of a motorcycle for transmitting a wireless signal when the brake or direction signal is actuated. A display is attachable to a helmet and configured to illuminate upon receiving the wireless signal from the transmitter.

The display comprises a base housing attachable to an outer surface of the helmet. The base housing is flexible so as to conform to the outer surface of the helmet.

An illumination module is at least partially disposed within the base housing. The illumination module comprises a power source, illuminating LEDs, a wireless signal receiver and electronic components for illuminating the LEDs in response to a transmitted wireless signal. The illumination module is preferably flexible.

A flexible applique overlies the illumination module. The applique is at least partially transparent or translucent so as to pass light from the LEDs therethrough. The at least partially transparent or translucent portion of the applique may define a logo and/or word indicia viewable from behind the helmet. The applique is removably attachable to the base housing and/or the illumination module. The system may include a second applique having a second logo and/or indicia. The second applique may be removably attachable to the base housing and/or the illumination module in place of the first applique.

Typically, a periphery of the illumination module is disposed within the base housing and the applique is removably adhered to an exposed portion of an outermost layer of the illumination module. The illumination module may emit a first light color and/or intensity through the applique during normal operation, and emit another light color and/or intensity upon transmission of the wireless signal. For instance, the illumination module emits a red light through the applique when the brake of the motorcycle is actuated.

The system includes a charger for charging a rechargeable battery power source of the illumination module. The charger is configured to be removably attachable to the display so as to overlay the display. The charger may wirelessly charge the rechargeable battery power source of the illumination module. The charger may have an outer configuration substantially matching that of the display, and include at least a portion that is transparent or translucent defining a logo and/or indicia that is illuminated as the charger recharges the display.

The present invention also relates to a method for monitoring a vehicle status. The method may comprise detecting a status of a light of the vehicle, such as associating a sensor with a headlight of the vehicle. The sensor may detect whether the headlight is illuminated. A signal may be wirelessly transmitted relating to the status of the light, which is received on a portable handheld device. A user is notified of the status of the light through the handheld device, such as by emitting an audible sound notification from the handheld device or displaying a notification on a display of the handheld device. For example, the notification may be provided to the user through the handheld device when the light is illuminated and the vehicle is powered off, so as to prevent unnecessary draining of the battery.

The method for monitoring the vehicle status may additionally or alternatively comprise detecting the status of a tire of the vehicle. A sensor may be associated with the tire of the vehicle, wherein the sensor may detect an internal pressure of the tire. A signal is wirelessly transmitted relating to the status of the tire, such as to the portable handheld device. A user may be notified of the status of the tire through the handheld device, such as emitting an audible sound notification from the handheld device or displaying the notification on a display of the handheld device. The notification may be provided to the user through the handheld device when the tire pressure is below a predetermined amount.

The method of monitoring the vehicle status may additionally or alternatively comprise detecting a status of motion of a vehicle or an associated helmet. A motion sensor is associated with the vehicle or helmet that detects movement of the vehicle or helmet over time. A signal is wirelessly transmitted to a portable handheld device relating to the status of the vehicle's or helmet's motion. The notification may be by emitting an audible sound notification from the handheld device or displaying a notification on the display of the handheld device. The user is notified of the status of the motion through the handheld device under predetermined conditions. For example, a notification may be provided to the user when the vehicle's motion decreases at least a predetermined amount over a predetermined time period. A message may be sent or a telephone call created to predetermined emergency contacts in response to the vehicle's motion decrease. This may be done automatically if the user does not cancel the notification within a predetermined period of time. The user may be notified of motion of the vehicle or helmet through the handheld device when an anti-theft feature or software running on the handheld device is activated and motion of the vehicle or helmet is detected when it is unanticipated.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention is directed to a helmet lighting system, generally referred to by the reference number 10. The helmet lighting system 10 provides a convenient system for warning drivers behind a motorcyclist that the motorcyclist is slowing down or changing directions by illuminating at least a portion of a motorcycle helmet. Moreover, the present invention provides decorative elements, as well as the aforementioned safety features, in an economical and easy-to-use system.

Figure 1:
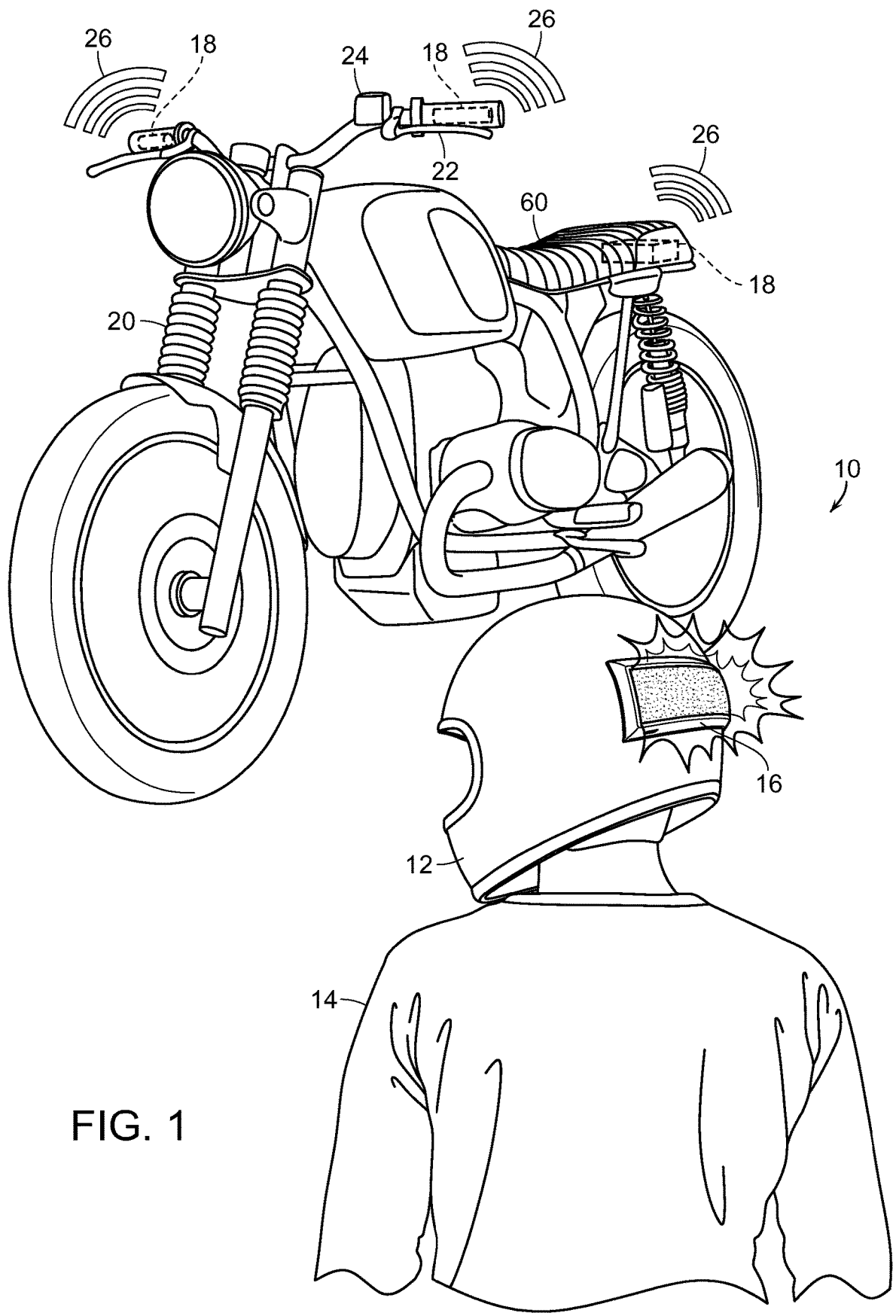
FIG. 1 is a perspective view of a motorcycle and a helmet on a motorcycle rider incorporating the helmet lighting system of the present invention.

With reference now to FIG. 1, the helmet lighting system 10 of the present invention is generally illustrated. A helmet 12 worn by a motorcyclist 14 has a display 16 attached thereto. Typically, as illustrated, the display 16 is placed on a rear portion of the helmet 12 so that those behind the motorcyclist 14, and to a lesser extent those to the side of the motorcyclist, can view the display 16. The display 16, as will be more fully described herein, is configured to illuminate, or change light intensity or color, upon receiving a wireless signal from a wireless transmitter 18 placed in or on a motorcycle 20. The wireless transmitter 18, which may comprise a single wireless transmitter or multiple wireless transmitters, is operably coupled to a brake 22 or turn direction signal 24 of the motorcycle 20, such that as the brake 22 and/or turn direction signal light 24 is actuated, the wireless transmitter transmits a wireless signal 26, such as a Bluetooth or radiofrequency signal, which is received by display 16.

Figure 2:
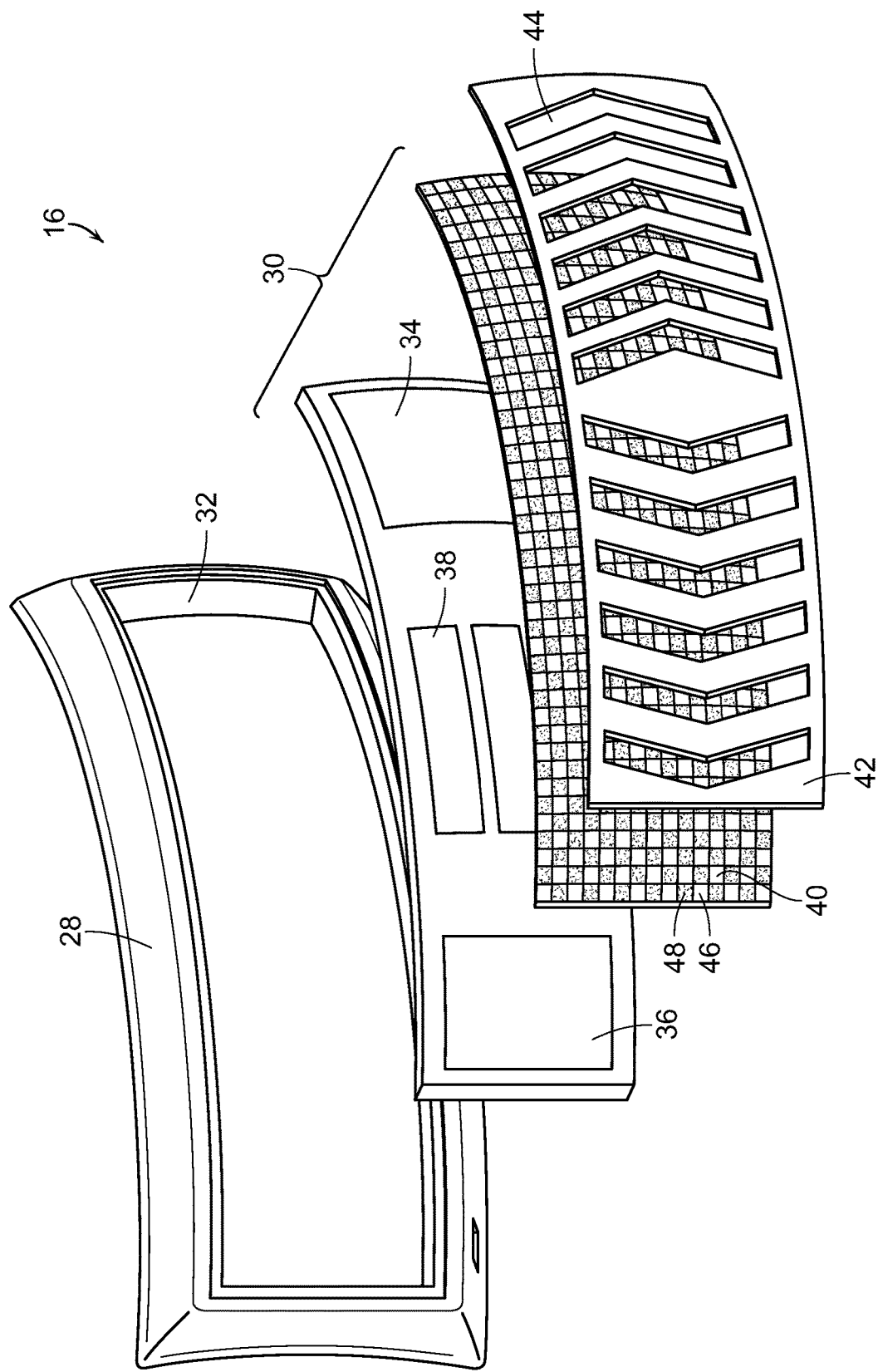
FIG. 2 is an exploded perspective view of a display attachable to a helmet, in accordance with the present invention.

With reference now to FIG. 2, an exploded perspective view of a display 16 embodying the present invention is shown. The display 16 comprises a base housing 28 having a back surface thereof attachable to the helmet 12. This can be, typically, by means of an adhesive. The base housing 28 is comprised of a flexible material, such as a rubber or polyurethane material or the like. The base 28 is preferably flexible in nature so as to conform to an outer surface of the helmet 12 to which it is attached. As the display 16 is typically attached to preexisting helmets, it is desirable that the display 16 be flexible and capable of conforming to different styles and configurations of helmets. An illumination module 30 is at least partially disposed within the base housing 28. For example, as illustrated, a periphery of the illumination module 30 is disposed within an inner track 32 formed on an inner peripheral surface of the base housing 28 so as to reside therein while an outer layer or surface of the illumination module 30 remains exposed when inserted into the base housing 28.

With continuing reference to FIG. 2, the illumination module 30 is comprised of a power source 34, a wireless signal receiver 36 and electronic components 38 for illuminating LEDs 40 in response to receiving a transmitted wireless signal 26 from the wireless transmitter 18. The power source 34 is typically a rechargeable battery, such as a rechargeable lithium ion battery or the like. Preferably, the illumination module is also flexible, such as being encapsulated in polyurethane rubber or the like, so as to fit within the base housing 28 and also conform to the outer surface of the helmet 12.

Figure 3:
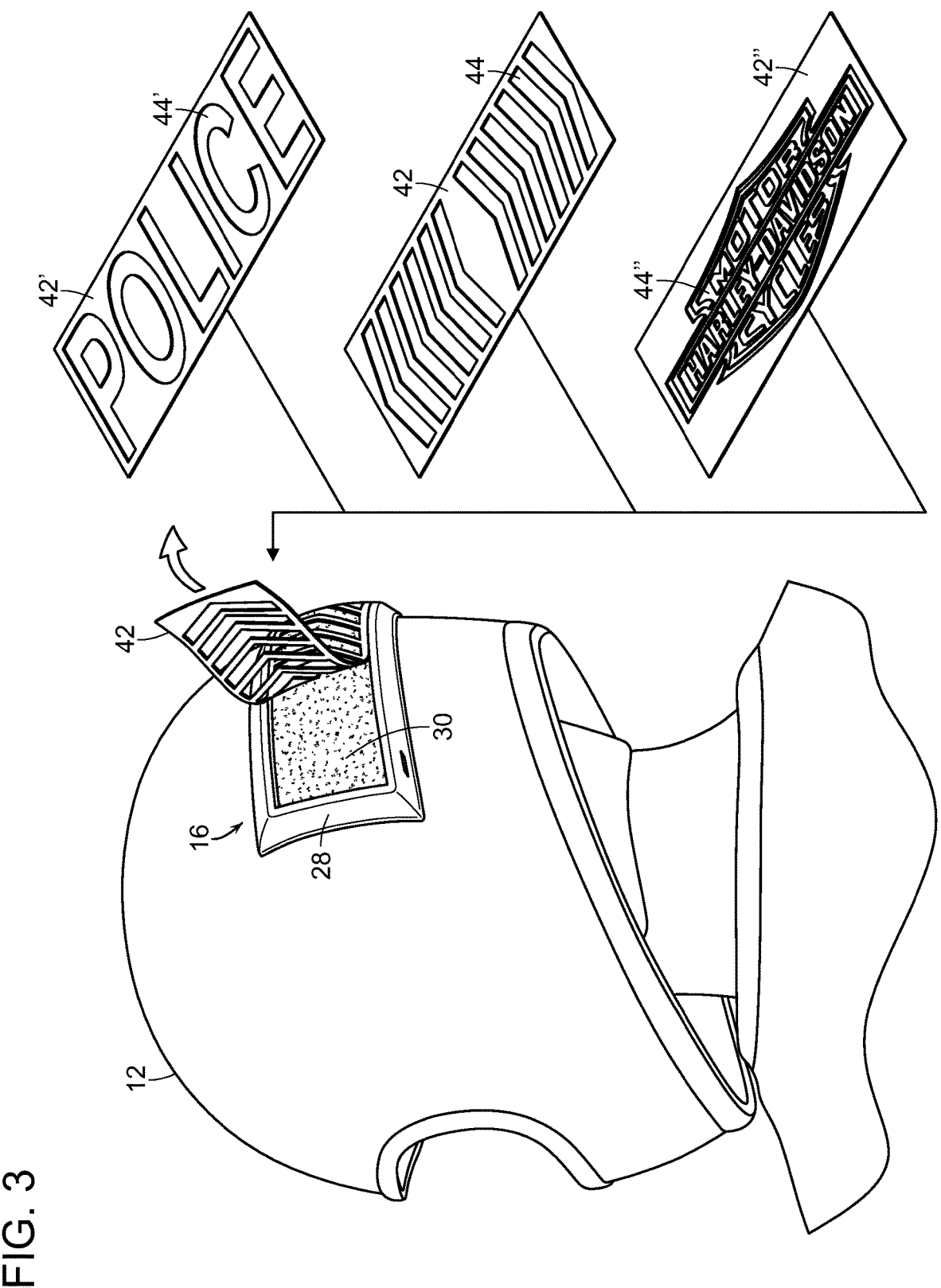
FIG. 3 is a rear perspective view of a helmet having the display attached thereto, and illustrating the removal and replacement of an applique to the display, in accordance with the present invention.

With reference now to FIGS. 2 and 3, a flexible applique 42 is removably attachable to the illumination module 30 and/or the base housing 28. The applique 46 may be comprised of a flexible material, such as polyurethane, so as to overly the illumination module 30 and generally conform to the illumination module 30 and/or base housing 28, which when attached to the helmet 12 generally conform to the outer surface and configuration thereof. Typically, the applique 42 is removably attached to an outer exposed surface of the illumination module 30, such as the LED layer 40 of the illumination module 30.

The applique 42 has portions 44 which allow light to pass therethrough, such as being at least partially transparent or translucent so as to pass light from the LEDs therethrough. In preferred embodiments of the invention, the at least partially transparent or translucent portions 44 of the applique define a word, indicia, and/or a logo, such as that shown in FIG. 3, which are viewable from behind the helmet 12. For example, as illustrated in FIG. 2, the portions 44 which allow light to pass therethrough may be formed as directional arrows. When the motorcycle brake is actuated, light may pass through all of the directional arrow portions 44. However, when a direction turn signal of the motorcycle is actuated, the LEDs may only illuminate selected portions 44, either simultaneously or in sequence, to indicate to those travelling behind the motorcyclist that the motorcyclist is turning left or right, for example. However, as seen in FIG. 3, the portions 44' may form letter indicia forming a word, such as "police", but could also include other words such as "stop", etc. As further illustrated in FIG. 3, the light transmitting portions of the applique could be in the form of logos and/or other indicia, such as the "Harley-Davidson Motorcycles" logo 44" of applique 42", or any other desired logo or the like. In this manner, the display 16 may serve not only as a warning system but also as a decorative feature of the motorcyclist's helmet. It can be seen from FIG. 3 that an applique 42 may be peeled off, due to its removable connection to the illumination module 30 and/or base housing 28, such as by using removable adhesive such as 3M polyurethane rubber adhesive or the like, and replaced with another applique 42', 42", etc. In this manner, the helmet 12, and more particularly the display 16 may be customized by the motorcyclist.

With reference back to FIG. 2, as mentioned above, the illumination module 30 includes LEDs which are selectively illuminated. These LEDs may be COB (Chips on Board) or the like. The LEDs 40 may only be illuminated when a wireless signal is received by the illumination module, such that the display 16 is only illuminated when the brake and/or direction signal lever or switch of the motorcycle is actuated. However, preferably, at least a portion of the LEDs 40 are constantly illuminated when the system is in use so that those behind the motorcyclist can view the logo and/or indicia of the applique of the display 16. When the brake 22 or turn direction signal 24 of the motorcycle 20 is actuated, resulting in a wireless signal 26 being transmitted from the wireless transmitter 18, additional or other LEDs are illuminated so that a greater intensity of light is emitted from the display 16 or a different color of light is emitted from the display 16. For example, the applique 42 may be illuminated by LEDs 40 of a first color, graphically illustrated by the white blocks 46 in FIG. 2, which may be, for example, white, blue, etc. When the brake 22 of the motorcycle 20 is actuated, resulting in the generation of a wireless signal 26, a second color, graphically represented in FIG. 2 by the shaded areas 48, may be illuminated, which could be a red color, for example. Thus, when the motorcyclist applies the brake, the display 16 changes from the first color, such as white or blue, to a second color, such as red, to alert those traveling behind the motorcyclist that he or she is slowing down or stopping. The first or second color LEDs 46 or 48 could be utilized to indicate when the turn direction signal 24 of the motorcycle 20 is actuated, and that a left portion of the applique 42 is illuminated in a greater intensity or a different color, or a flashing or pulsating illumination of light or different color, or even a sequential illumination, such as from center to left of the applique. It will also be understood that a third color, or more, could be utilized. The LEDs 46 and 48 may be of a different color, or multi-color LEDs may be utilized. Moreover, while the preferred embodiment utilizes LEDs it will be appreciated that other sources of illumination could be utilized instead. It will be appreciated that the electronic components 38 of the illumination module 30 will include those components, such as a microcontroller or microprocessor, to control the illumination of the LEDs on a normally operating basis as well as when the wireless signal 26 is received.

Figure 4:
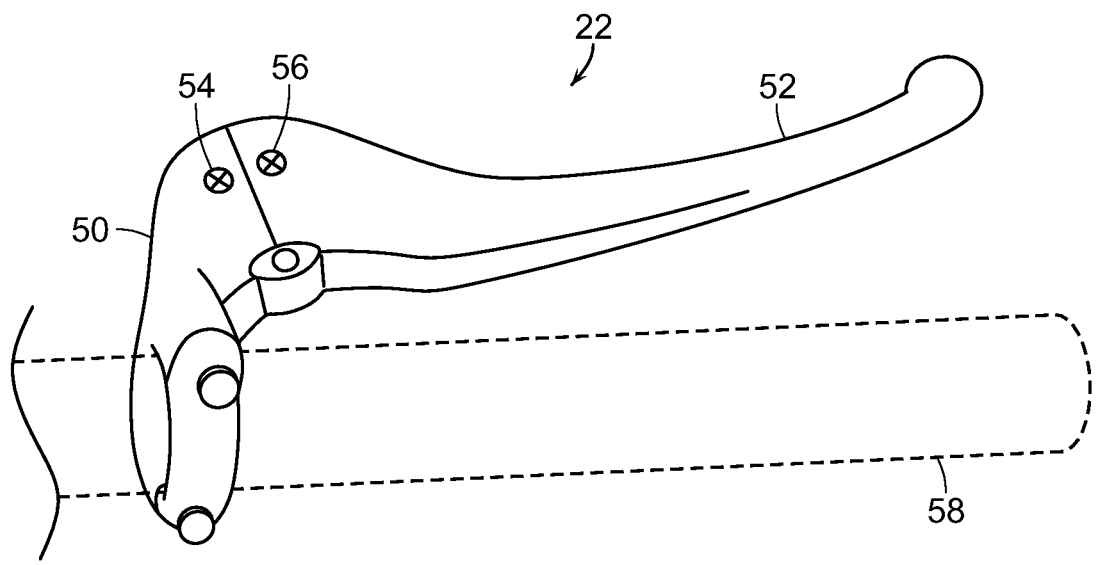
FIG. 4 is a diagrammatic view of a brake lever of a motorcycle in a non-braking position.
Figure 5:
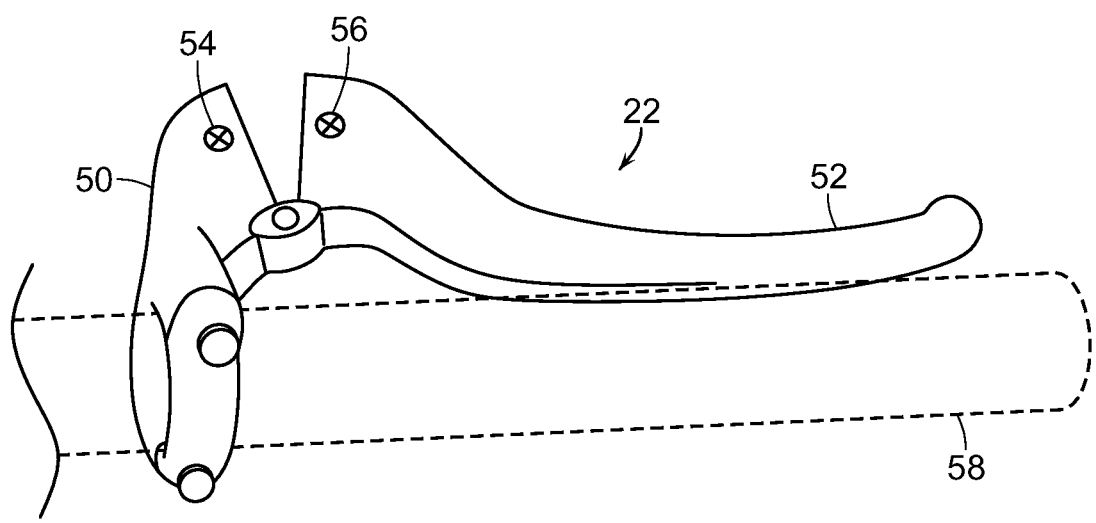
FIG. 5 is a perspective and diagrammatic view similar to FIG. 4, illustrating actuation of the brake lever and sensors associated with the wireless transmitter, in accordance with the present invention.

With reference now to FIGS. 4 and 5, the wireless transmitter 18 can be operably coupled to the brake 22 and/or directional turn signals 24 of the motorcycle 20 in a variety of ways. For example, a brake assembly 22 is illustrated in FIGS. 4 and 5 having a base component 50 and a lever component 52. Sensors 54 and 56 are associated with the base component 50 and the lever 52. When the brake is not being applied, as illustrated in FIG. 4, the sensors 54 and 56 are in a first position. However, when the brake is applied, such as by depressing the lever 52 towards the handle 58 of the motorcycle, at least one of the sensors 54 and 56 is moved into a second position, thus actuating the sensors such that the wireless transmitter 18 generates a wireless signal 26. This will, as described above, cause the display 16 to be illuminated, such as with a red light emanating from the LEDs 40. A similar arrangement can be used with the foot pedal brake of the motorcycle and turn direction signals. However, other means of detecting the braking and/or activation of a turn signal of the motorcycle 20 can be utilized such as coupling a sensor to the brake light and/or turn lights of the motorcycle 20, the wiring extending between the brake and/or a turn signal switch to the respective light, or the like. The sensor may detect electricity or current being applied to the electric cable, light module, bulb socket, or the like so as to sense that the brake and/or turn directional signal has been actuated. The wireless transmitter may be disposed in a convenient location on or in the motorcycle 20, such as within the handle 58, under the seat 60 or any other desirable location.

It is also contemplated by the present invention that a speed or motion sensor, such as an accelerometer or a gyro or the like be disposed within the display 16, motorcycle 20, or even the helmet 12 which could sense when the motorcycle is decelerating or moving left or right. This may be in addition to, or used instead of, the sensors mentioned above. In those instances, the display 16 will be illuminated, either by a different light intensity and/or color to indicate such deceleration or left or right movement. This can be, as described above, by utilizing a different intensity of light, a different color of light, such as red for stopping or amber for turning or the like.

Figure 6:
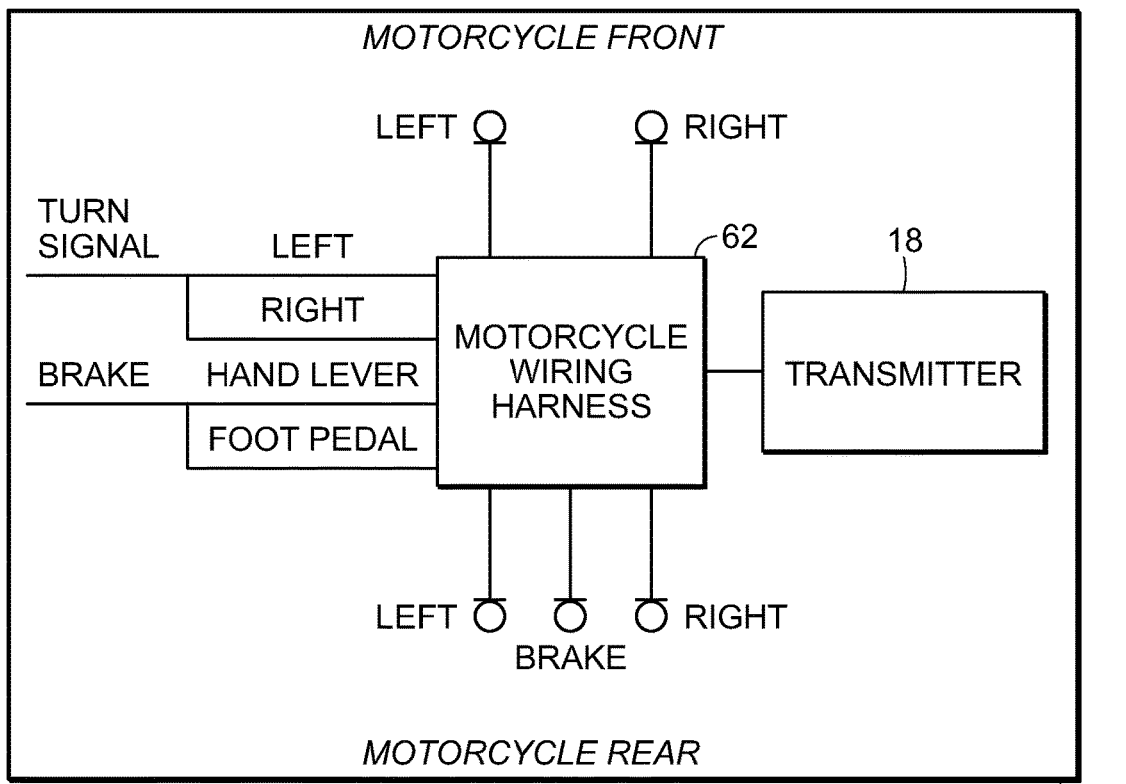
FIG. 6 is a block diagram illustrating how a wireless signal may be generated by actuation of a brake or direction signal of the motorcycle.

With reference now to FIG. 6, the wireless transmitter 18 is operably connected to the hand lever and/or foot pedal brake as well as the left or right turn directional signal. This may be via the motorcycle wiring harness 62, or other aspect of the electrical system of the motorcycle, such as the left or right turn signal lights or wiring or brake light or wiring, as illustrated in box 64. The designations of "left" and "right" at the top of the box 64 represent the left and right turn signal lights at the front of the motorcycle. Similarly, the "left" and "right" designations at the bottom of box 64 represent the left and right turn signal lights at the rear of the motorcycle. The brake light is also diagrammatically illustrated at the rear of the motorcycle in FIG. 6.

Figure 7:
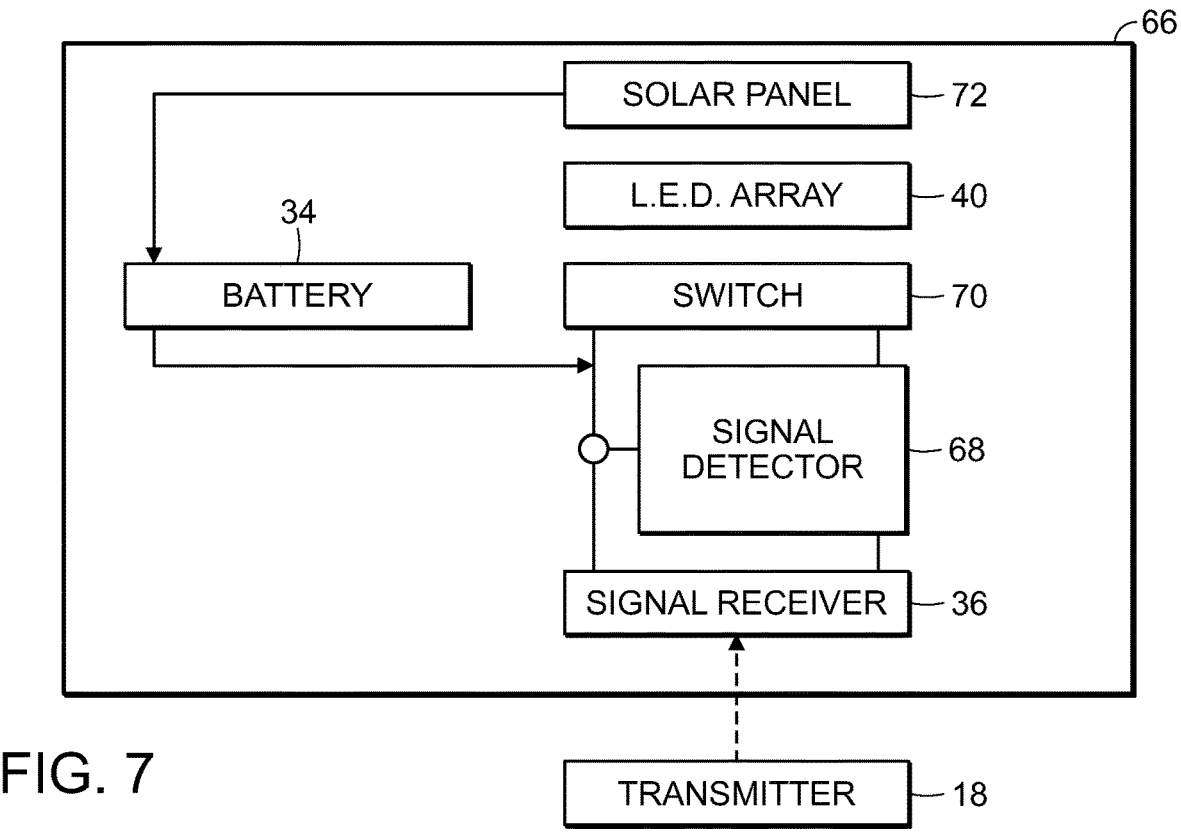
FIG. 7 is a block diagram illustrating the receipt of a wireless signal from the transmitter by the display so as to illuminate the display, in accordance with the present invention.

With reference to FIG. 7, when the wireless transmitter 18 generates and transmits a wireless signal 26, various components of the display 16, as illustrated in box 66 may be activated. The signal receiver 36 receives the wireless signal, which may comprise a Bluetooth or radiofrequency signal or the like. A signal detector 68 may activate a switch 70 which provides power from the power source, typically a rechargeable battery 34, to the LED array 40. As described above, in a particularly preferred embodiment, the LED array 40 is at least partially illuminated or illuminated with a first color during normal operation, but is illuminated with a higher intensity or a different color when a wireless signal indicating that a brake or turn direction signal of the motorcycle 20 has been actuated. The transmitter 18 may generate a different wireless signal, depending upon whether the brake is actuated, a left turn direction signal is activated, or a right turn signal is activated so that the electronic components 38 of the illumination module 30 may properly illuminate the LED array, such as illuminating red LEDs when the brake is actuated, amber LEDs when the turn signals are actuated and the like.

The power source 34 of the display 16 is typically a battery. The battery may be replaced as needed. More typically, however, the battery 34 is rechargeable. This may be by a variety of means, including a solar panel 72 which is attachable to, for example, a top surface of the helmet 12. During the daylight hours, the solar panel 72 could charge the battery 34, which would then supply power to the display 16 during operation of the display 16 and system 10 during the day and/or night.

Figure 8:
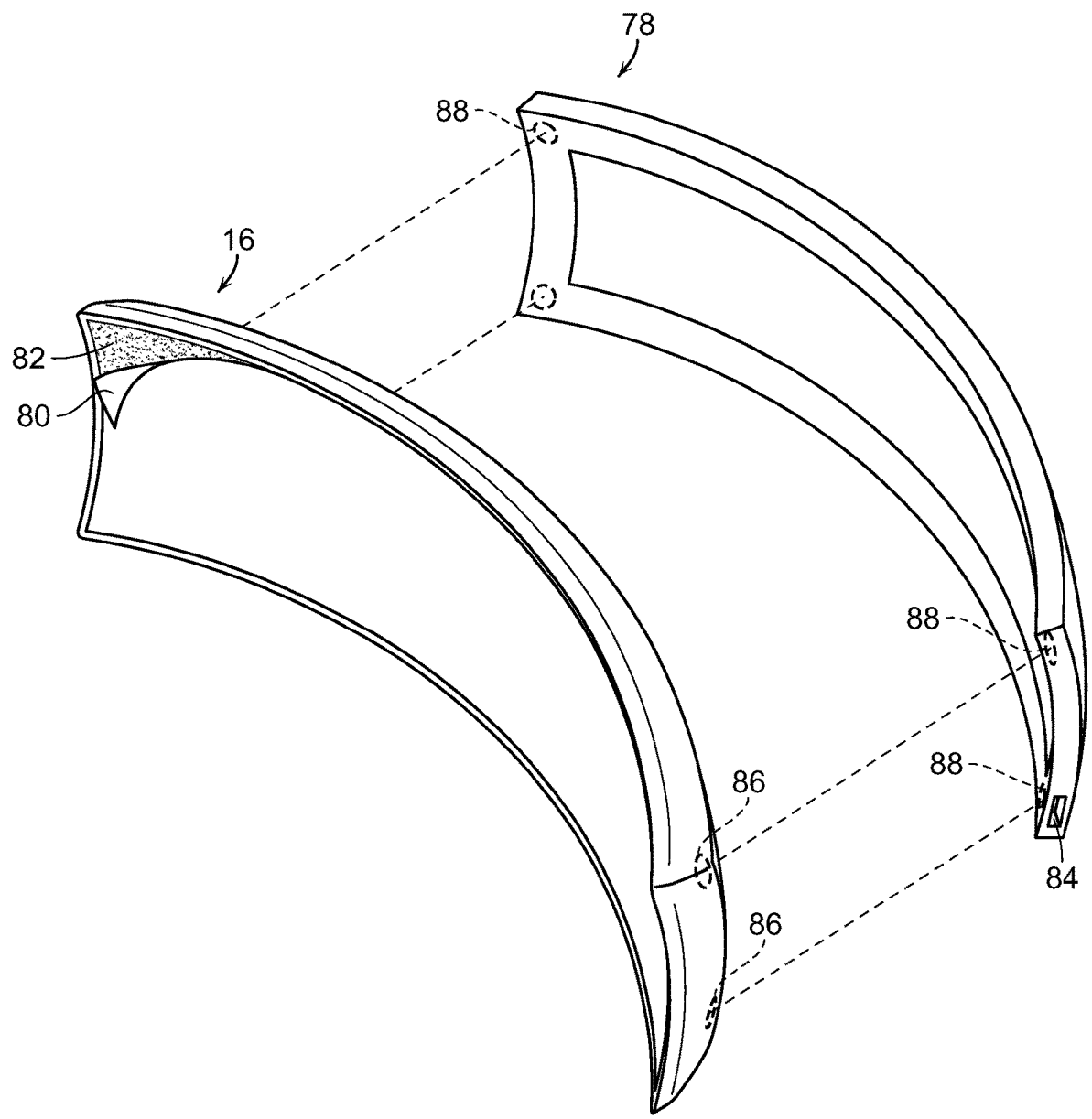
FIG. 8 is a rear perspective and exploded view illustrating the display of the present invention and a charger removably attached thereto.
Figure 9:
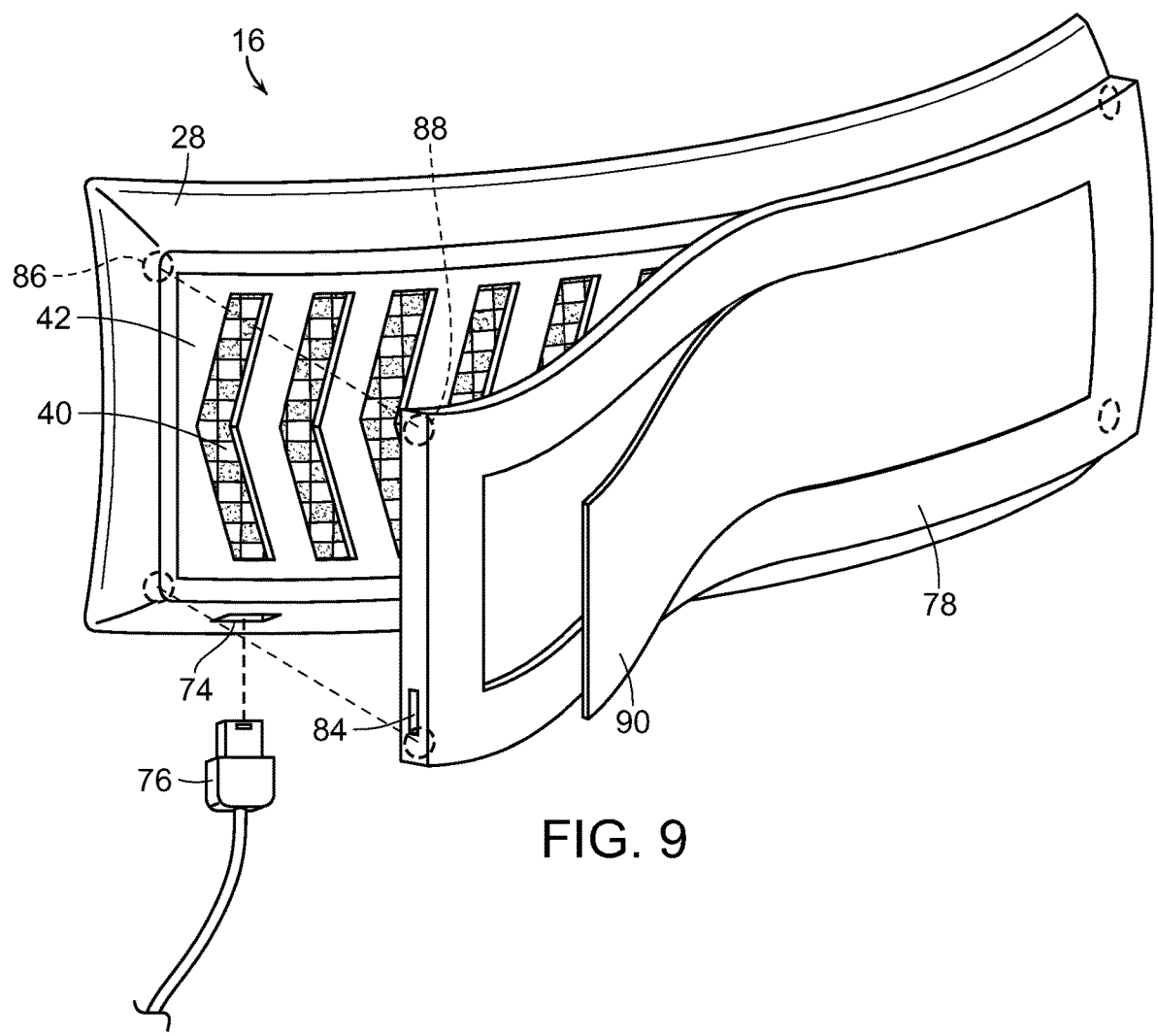
FIG. 9 is a front perspective view of the display having a charger operably attached thereto, in accordance with the present invention.

FIGS. 8 and 9 illustrate alternative ways of charging the rechargeable battery 34 of the illumination module 30. For example, as illustrated in FIG. 9, the display 16 may include a power port 74 for receiving a power cord 76 which is connected to any suitable power source. For example, the power cord 76 could comprise a USB cable coupled to a computer or to a recharging unit insertable into a wall power outlet. The rechargeable battery 34 could also be charged wirelessly, such as by placing the display 16, such as the helmet 12 to which the display 16 is attached, onto a wireless charging pad or the like, which could be placed, for example, on a table, counter or the like.

In a particularly preferred embodiment, however, a charger 78 is utilized which is removably attachable to the display 16 so as to overlay the display 16, as illustrated in FIGS. 8 and 9. Although the display 16 in FIG. 8 is illustrated as being separated from the helmet 12, it will be appreciated that typically the display 16 will be attached to the helmet, such as peeling off layer 80 to expose adhesive 82 to affix the display 16, particularly the back side of base housing 28 to the helmet 12. Thus, the display unit 16 is typically attached to the helmet 12 when the battery 34 is recharged. The charger 78 may include a power port 84 for interconnecting the charger 78 with the display 16, such as having power cord 76 interconnected between charging port 74 and 84. However, in a particularly preferred embodiment, the charger 78 wirelessly charges the rechargeable battery 34 by being overlaid and attached to a front surface of the display 16, so as to place it in sufficiently close contact so as to wirelessly charge battery 34 of the display 16. The removable connection may be made, for example, by magnets 86 and 88 associated, respectively, with the display 16 and the charger 78. Other attachment means are also contemplated by the present invention so as to removably attach the charger 78 to the display 16 so as to position the charger 78 on the display 16.

As illustrated in FIGS. 8 and 9, the charger 78 preferably is configured to substantially match that of the display 16, or at least an outer exposed surface of the display 16 so that the charger 78 overlies at least the exposed portion of the illumination module 30, and/or the applique 42. In one embodiment, the charger 78 includes at least a portion 90 that is transparent or translucent so as to permit light to be emitted therethrough. An applique 42 may be removably attachable to the outer surface of the charger 78 so as to define the logo and/or indicia of the applique, or the transparent or translucent portion 90 of the charger 78 may be formed so as to define a logo and/or indicia which is illuminated as the charger 78 recharges the battery 34 of the display 16. In this manner, the charger 78 may be utilized simultaneously with the display 16 and recharge the battery 34 of the display 16 while in use while riding the motorcycle if the light emitting portion 90 of the charger 78 allows light therethrough from the illumination module 40 of the display 16. However, in other instances, the charger 78 may merely be used when the display 16 is not in use when riding the motorcycle, and instead the logo or indicia illuminated by the light emitting portion 90 thereof is used merely for decorative purposes. It is contemplated that the charging unit 78 have its own interchangeable applique decals which can be removably attached to the light emitting portion 90 of the charging unit 78 so that a variety of indicia and/or logos and the like can be displayed and viewed when the charger 78 is in use.

It is also contemplated by the present invention to have an additional warning system. A transmitting beacon would be associated with the motorcycle and transmit a wireless signal. The range of the wireless signal could be controlled, such as up to one hundred meters, for example. Vehicles could be retrofitted or newer vehicles have installed, a signal receiver system wherein when the car is going to turn lanes and/or turn in an intersection, particularly when turning left, that the wireless signal transmitted from the motorcycle is received and a warning is issued to the driver of the vehicle to alert the driver that a motorcycle is in the close vicinity of the vehicle. This may be done, for example, when actuating the left signal of the vehicle, which activates a receiver which checks to receive if a motorcycle wireless signal is transmitted in the area near the vehicle. If so, a warning, such as a flashing light and/or audible noise or the like can alert the driver so that the driver does not accidentally turn in front of or hit the motorcycle which may be in a lane adjacent to the vehicle or in oncoming traffic to an intersection where the vehicle is turning left. A large number of accidents occur when vehicles inadvertently turn into an oncoming motorcycle or motorcycle in an adjacent lane to the vehicle as the drivers either do not see or are not sufficiently attentive to motorcyclists either to the side of the vehicle or coming from opposing traffic. Such a warning system could prevent a large number of such accidents.

With reference to FIGS. 10-23, a mobile software application is used to connect to various devices associated with a system and software of the present invention, which may be generally referred to as "Moto Ring" herein, through Bluetooth technology, display various services through an internet connection to the Moto Ring server. This app generally provides useful services to the user as well as being a social networking app to bring the motor enthusiast community together.

Figure 10:
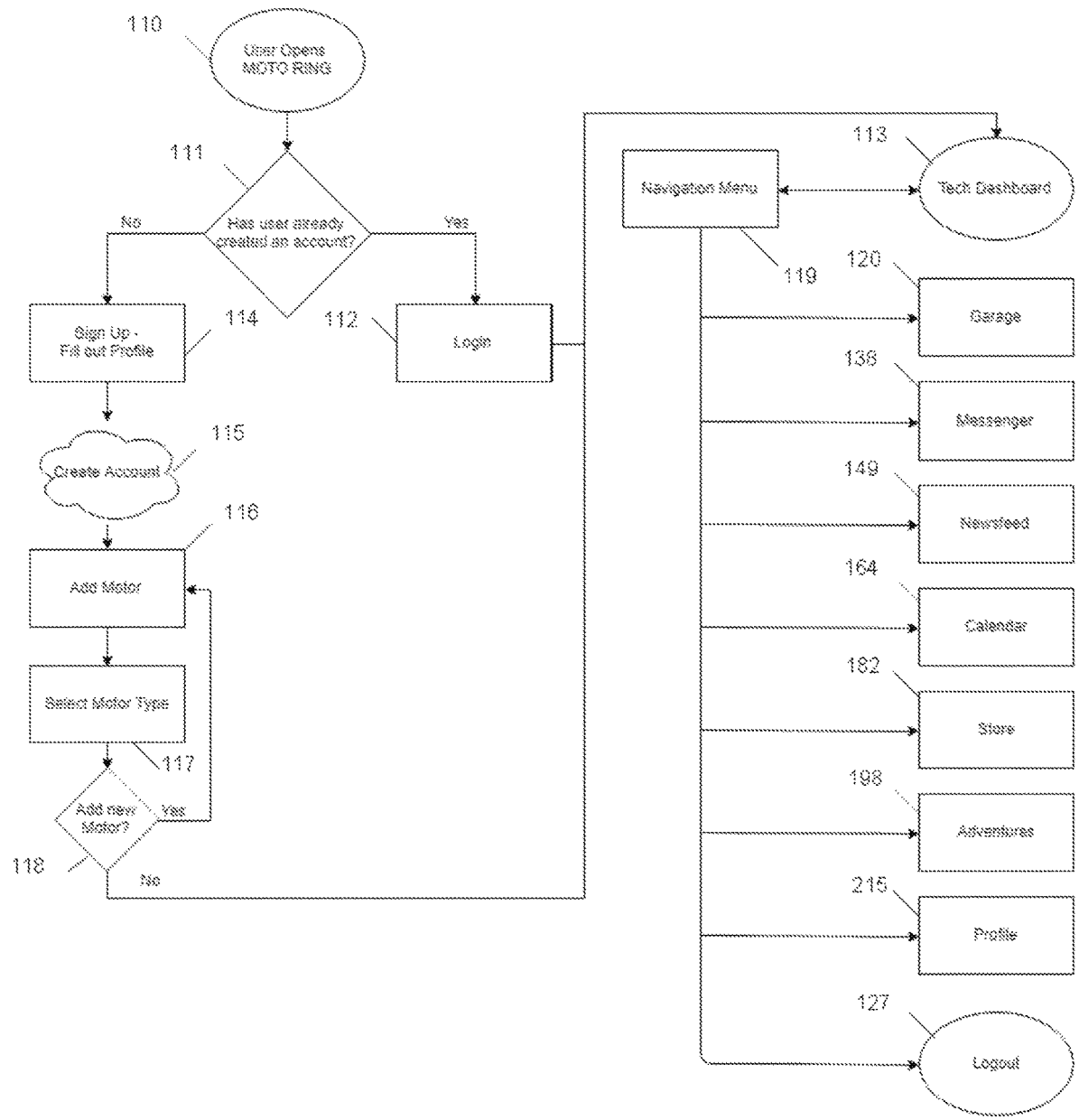
FIGS. 10-23 are flowcharts depicting steps taken in accordance with a software application embodying the present invention and utilized in connection with the method for monitoring a vehicle status, in accordance with the present invention.

With reference to FIG. 10, the user will open the app and see a splash screen with the Moto Ring brand 110. The app will check the user's phone local storage if a login token was stored 111. If a login token is stored, the app will automatically use this token to log in to the server and if successful 112, the user will load into the rest of the app, starting first at the Tech Dashboard view 113. If the token was expired or there was any other failure to log in with the token, the user will see the login view and be asked to log in with an email and password. Upon successful login, a new token will be sent to the user which will be stored locally on the user's phone.

If no token was discovered, the user will be prompted with the Sign-Up view 114. Here the user fills out a basic profile with at least email, password, confirm password and name. If the email already exists in the database, the user will be prevented from creating an account. If the email is unique and the passwords match, the user may then create an account and receive a token to be stored locally 115.

On successful account creation, the user is then presented with the prompt to Add a Motor 116. Adding a motor is the process of selecting a vehicle to add to their Garage of owned vehicles or to add vehicles they are interested in. They do this by first selecting the motor type 117 (Motorcycle, All Terrain Vehicles, Sports Cars, etc.), then the make and model. Once a user is finished adding a motor, they will be prompted to either add another motor or to skip and move into the rest of the app. If the user chooses to add another motor 118, they will repeat this process. If they choose to skip, their local token will be validated. If successful they will log into the app starting at the Tech Dashboard 113 with the ability to press on a menu button to see the Navigation View 119 to see the other views of the app.

The app will have a Tech Dashboard 113 where the user will be able to: 1) connect various Bluetooth devices associated with Moto Ring, and 2) view various services the app provides (like road conditions).

There will be a Garage part of the app 120, where the user adds vehicles that they own. Having this information will allow algorithms to serve relevant and useful information to the user across the app. For instance, if the user adds a Ferrari to their garage, they will see Ferrari related events and news items in their Newsfeed or certain promoted products in the Store, or local Ferrari meet ups in Adventures.

There will be a Messenger part of the app 138 where users can message other users.

There will be a Newsfeed part of the app 149. The Newsfeed will contain several kinds of news items: status posts from other users, advertisements, events happening nearby, etc. These news items will be based on the user's Garage vehicles as well as other users that they follow.

There will be a Calendar in the app 164. The calendar will contain events that the user has marked as interested in as well as events that the user might be interested based on their preferences and interactions with the app.

There will be a Store part of the app 182. Here affiliate organizations can list their products and services on the app. The user will be able to purchase products here or follow links to affiliate sites.

There will be an Adventures part of the app 198. Here users can find small meetup opportunities local to their area. These meetups are put together by other users. The focus here is on social rides or dates.

There will be a Profile part of the app 215, where the user is able to add a photo, bio, and update their account information.

Finally, the user can log out of the app 127.

Figure 11:
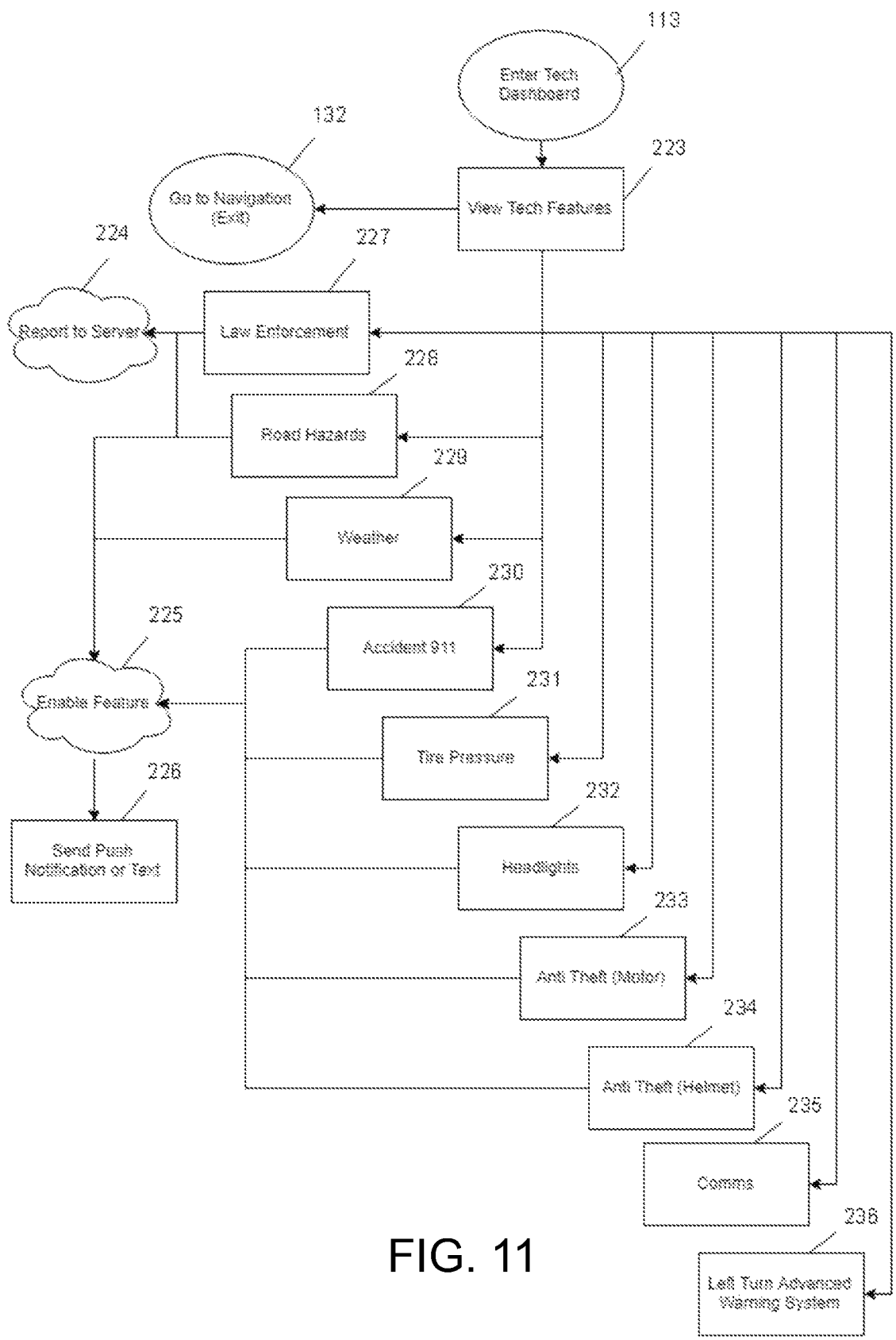

FIG. 11 illustrates steps and aspects of a Tech Dashboard of the invention. Entering the Tech Dashboard view 113, the user will be able to utilize various tech features. There will be tech features that utilize a Bluetooth connection to a device and/or some features delivered by the server. Each feature will be displayed as button on the screen. The app will detect what Bluetooth devices are connected to the phone. If there is a valid device that is connected that works with the app, the tech feature button associated with that device will be lit up, else the tech feature button will transparent and grayed out. Tapping on a tech feature button that is transparent and grayed out will open a Store view of products the user can purchase that work with this feature. Below are features of the app the user will see as buttons.

Law Enforcement 227, this button will indicate if this feature is on or off. Tapping on this will open the Law Enforcement view. The user can toggle this on or off. The user can report where they last saw law enforcement to the server 224. Enabling this feature will allow the server to send push notifications to the user when they are nearing last reported law enforcement 225.

Road Hazards 228, this button will indicate if this feature is on or off. Tapping on this will open the Road Hazards view. The user can toggle this on or off. The user can report where they last saw a road hazard and what type it is to the server 224. Enabling this feature will allow the server to send push notifications to the user when they are nearing recently reported road hazards 225.

Weather 229, this button will indicate if this feature is on or off. Tapping on this will open the Weather view. The user can toggle this on or off. Enabling this feature will allow the server to send push notifications to the user when they are nearing hazardous weather conditions or danger alerts (mudslide, fire, flash floods etc.) 225.

Accident 911 230, this button will indicate if this feature is on or off. Tapping on this button will bring up the Accident 911 view. The user can toggle this on or off. In the Accident 911 view, the user can add emergency contact (name and phone number) which will be submitted to the server to be stored in a database. Enabling this feature will allow the app to keep track of the acceleration of the user. If there is a sudden decrease in acceleration, indicating an accident, the app will report it to the server which will text an emergency contact on file 225.

Tire Pressure 231, this button will indicate if this feature is on or off and if a Bluetooth device is connected. The button will also indicate the tire pressure as measured by the device that is connected to the tire. Tapping on this button will open the Tire Pressure view. The user can toggle this on or off. Enabling this feature will receive tire pressure information from the Bluetooth device and send a push notification to the user if the tire pressure gets low 225.

Headlights 232, this button will indicate if this feature is on or off and if a Bluetooth device is connected. The button will indicate if the if the lights on the motor were left on as measured by the device that is connected to the lights. Tapping on this button will open the Headlights view. The user can toggle this on or off. Enabling this feature will allow the app to receive information about the state of the headlights of the vehicle, whether on or off. If the user moves away from the motor with the lights still on, a push notification will be sent to the user warning the user 225.

Anti-Theft (motor) 233, this button will indicate if the feature is on or off and if a Bluetooth device is connected. Tapping on this button will open the Anti-Theft view. The user can toggle this on or off. Enabling this feature will receive information from the connected Bluetooth device regarding the motion of the motorcycle or vehicle when the user is away from the motorcycle. The user will receive a push notification if the motor experiences any motion while the user is away from the motor 225.

Anti-Theft (helmet) 234, this button will indicate if the feature is on or off and if a Bluetooth device is connected. Tapping on this button will open the Anti-Theft Helmet view. The user can toggle this on or off. Enabling this feature will receive information from the connected Bluetooth device regarding the motion of the helmet when the user is away from the helmet. The user will receive a push notification if the helmet experiences any motion while the user is away from the helmet 225.

Comms 235, this button will indicate if the feature is on or off and if a Bluetooth device is connected. Tapping on this button will open the Comms view. The user can toggle this on or off. Enabling this feature will allow for the use of Bluetooth communications devices which allow the user to communicate with a hands-free device.

Left Turn Advanced Warning System 236, this button will indicate if the feature is on or off and if a Bluetooth device is connected. Tapping on this button will open the Left Turn view. The user can toggle this on or off. Enabling this feature will allow for the use of a Bluetooth warning devices which allow warn the user of oncoming traffic making a left turn into the user's lane.

The user can tap on a navigation button to access the other views of the app 132.

Figure 12:
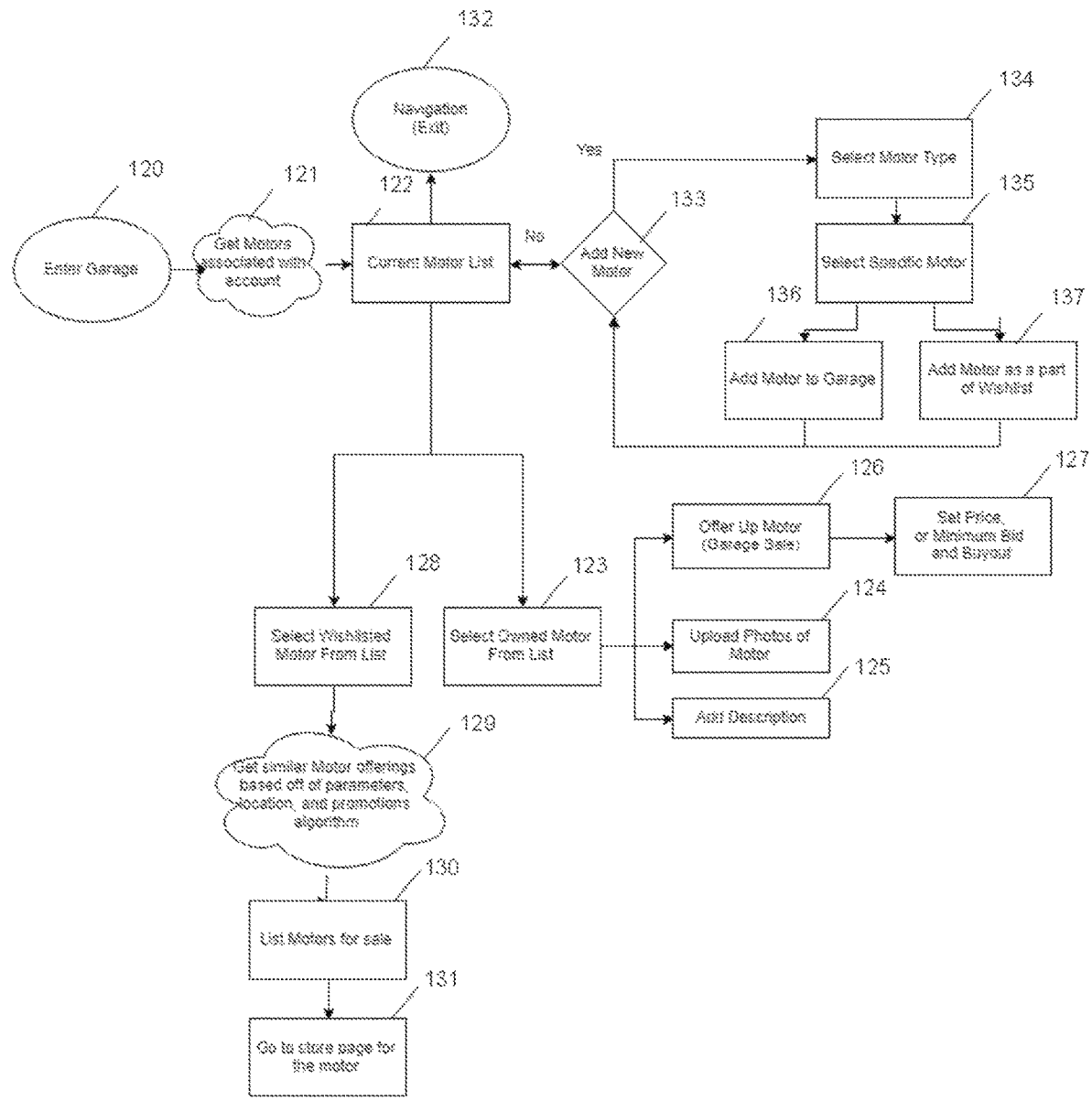

With reference to FIG. 12, entering the Garage view 120, the app will make a request to the server using their local authorization token for motors associated with the user's account 121. For the purposes of this invention, the term "motor" specifically refers to a vehicle the user had added to their digital garage. If the token is valid, then the server will search the database for motors added by the user and return the data back to the app.

The Garage view will then display motors previously added by the user in a list 122 of tappable buttons. Tapping on one of these motors will present a new motor view with different options specific to this motor. If the motor is physically owned by the user 123, they can tap a button to upload photos 124 of their motor which on submit would be sent to the server to be stored in a database. The user can also tap a button to add a description 125 of their motor which on submit would be sent to the server to be stored in a database. The user can also tap a button to offer their motor for sale 126 which brings up a new garage sale view where the user can set a price, or a minimum bid and buyout 127. This motor will be listed on the Store portion of the app.

If the motor is not physically owned by the user and is instead a wishlisted motor 128, tapping on this motor will open a new wishlisted motor view and send a request to the server for motor offerings listed by other users that closely match the wishlisted motor while also considering location 129. This wishlisted motor view will display the results in a list a of tappable offering view buttons 130. Tapping on of these buttons will take the user to the Store motor listing 131.

In the Garage view, the user may also tap on a add new motor button to go through the process of adding a new motor 133. The user will select a motor type 134, a specific motor 135, and choose to add it to their owned garage motors 136 or as wishlisted motor 137. At the end of this process, the user will be prompted on whether or not to add new motor 133.

The user can tap on a navigation button to access the other views of the app 132.

Figure 13:
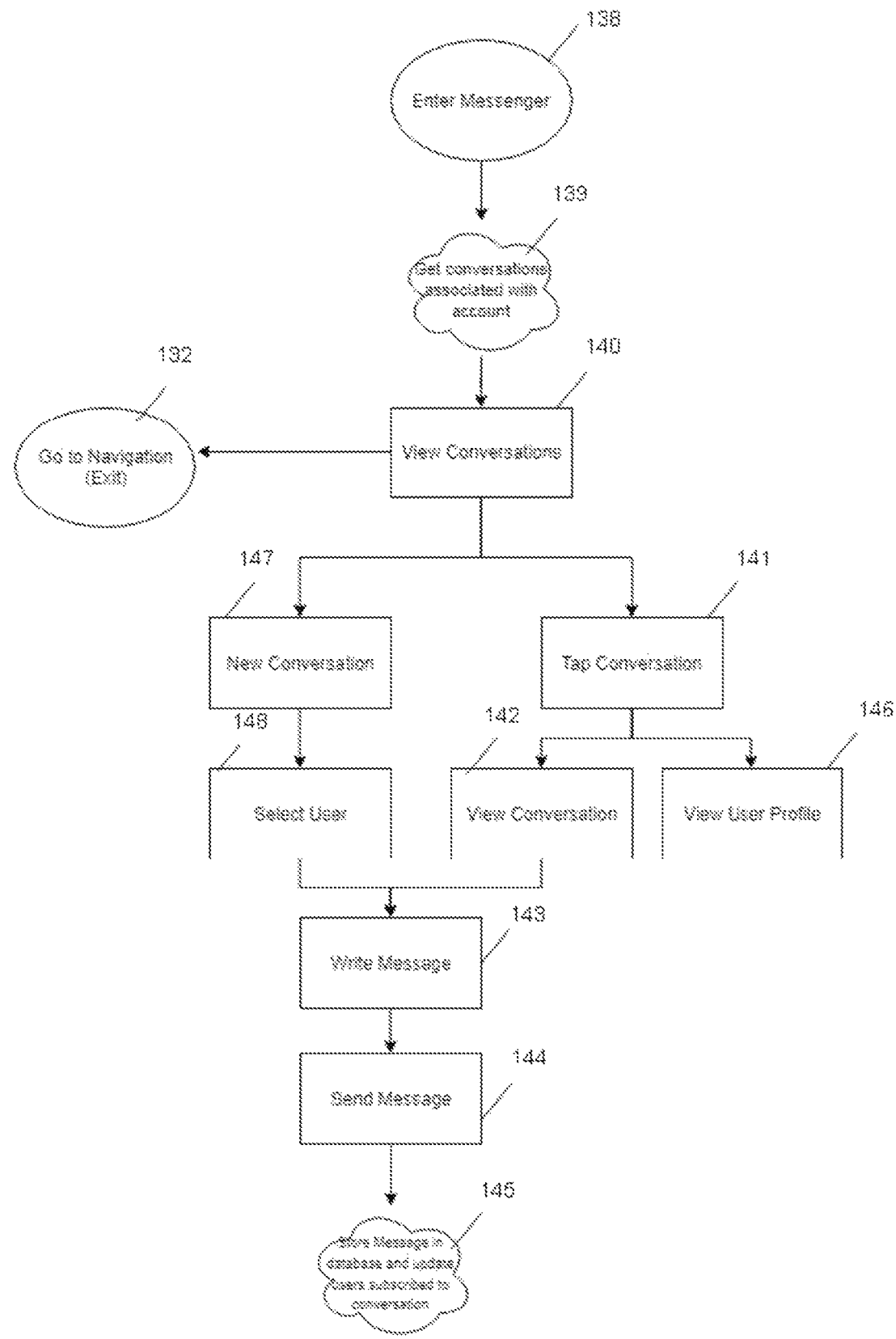

With reference to FIG. 13, entering the Messenger view 138, the app will make a request to the server using their local authorization token for any conversations already started by the user. If the token is valid, the server will search the database for conversations and return them to the app 139.

The Messenger view will display the returned conversations in tappable buttons 140. Tapping on a conversation will open a new conversation view 141. Here a history of the conversation between users will be displayed, with the ability for the user to scroll up and go further back in the conversation 142. Here the user will be able to see new messages sent by the other user(s) and the user will be able to write new messages. New messages, on submit, will be sent to the server and stored in a database 144. When the message is received by the server and stored in the database, it will update subscribed users in the conversation with the new message. The user is subscribed to the conversation and will receive any updates to the conversation by any other users that are a part of the conversation 145.

In this conversation view, the user may tap on any of the other users and view their profile in a profile view 146.

In the Messenger view, the user may tap a "new conversation" button 147. Tapping on this button will open a "new conversation" view. In this view, the user can add users to this conversation 148 by typing their names in the add users input field. The user may type their message in the message input field. Sending the message will work as previously described 144.

The user can tap on a navigation button to access the other views of the app 132.

Figure 14:
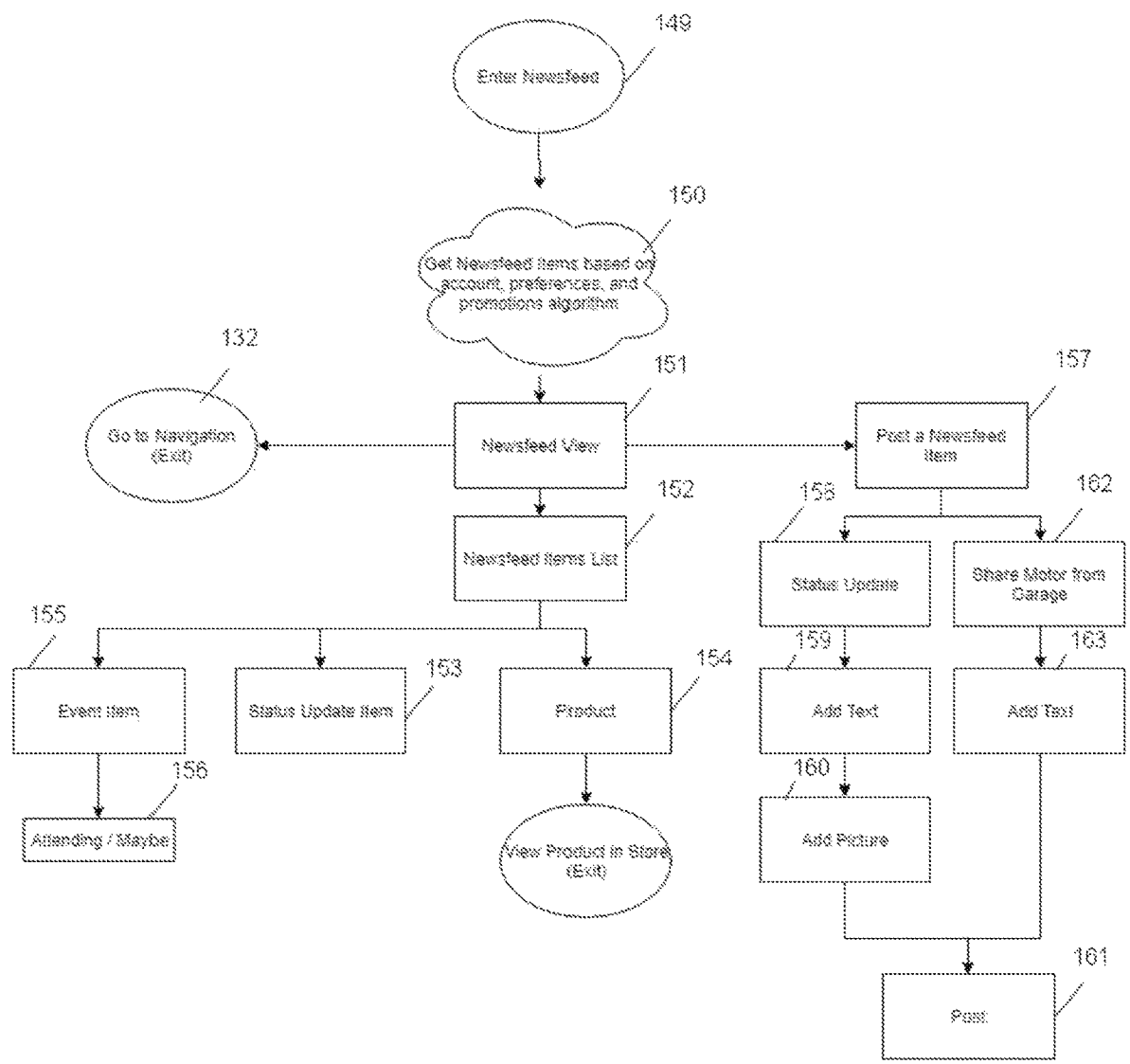

With reference to FIG. 14, entering the Newsfeed view 149, the app will make a request to the server using the local authorization token and get Newsfeed items 150 to display them in scrollable vertical list 152. Each newsfeed item type can be liked, commented on, or shared. There can be status update items 153 to view status posts that of other users as well as their own. There can be product items 154 that the user can tap on to view the item in the Store view. There can be Event items 155 that the user can mark as attending/maybe 156. What comes up in the user's Newsfeed scrollable list will be based on a number of factors including which other users they are following, the user's location, what the algorithm would deem relevant to that user, and any ads paid for by affiliated companies 150.

The user can also post a new item to their Newsfeed 157 for other users who follow them to see. The user can add a status update 158 by adding text 159 and/or a picture 160 and post it 161 for their followers to see. The user may also share a motor 162 from their garage, add text 163, and post this as well 161. This newsfeed item will be tappable, taking any user that taps it to that user's garage to view their motor.

The user can tap on a navigation button to access the other views of the app 132.

Figure 15:
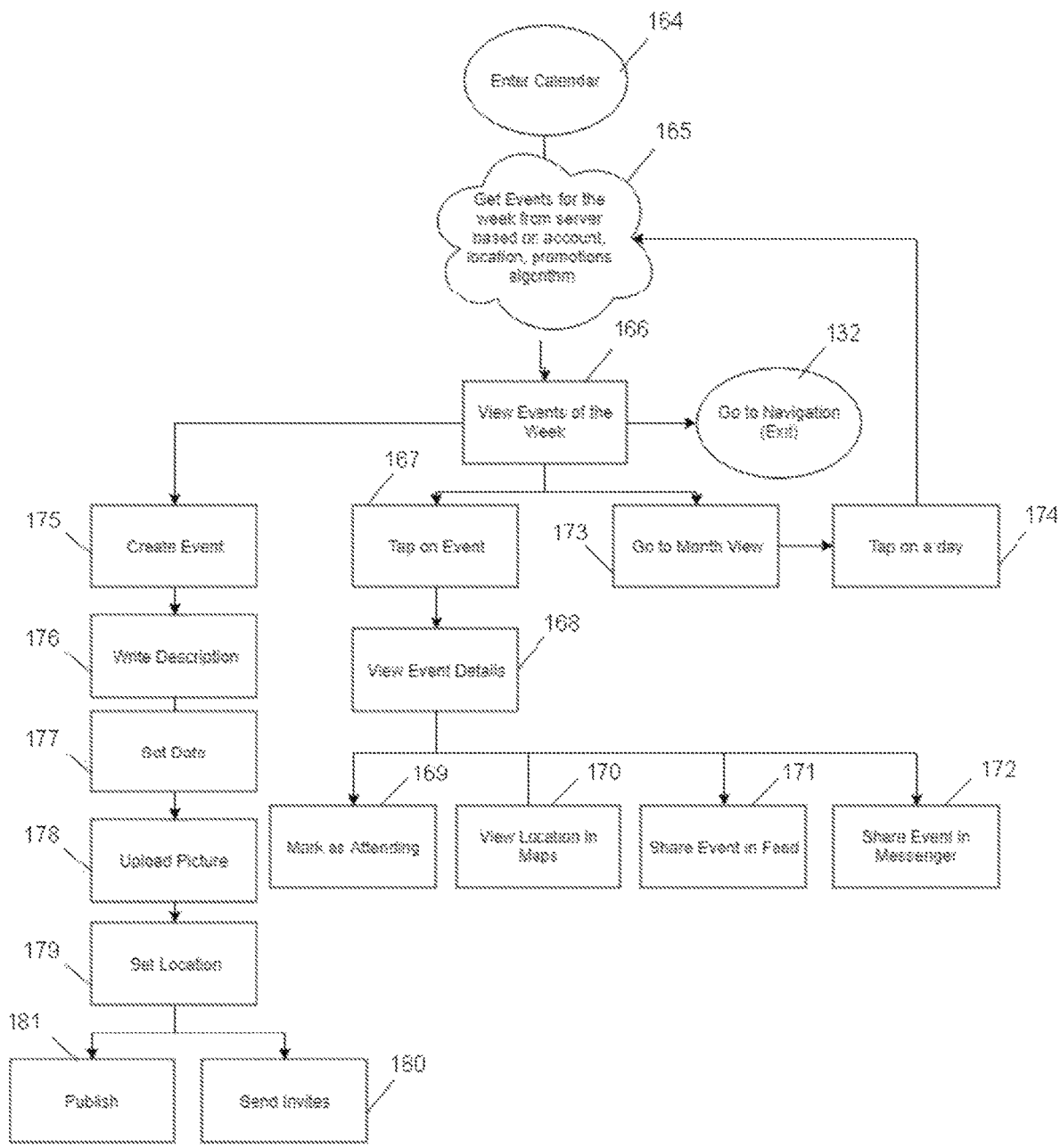

With reference to FIG. 15, entering the Calendar view 164, the app will make a request to the server using the locally stored authorization token and load events 165 that either the user had added to their calendar or what the server's algorithm deems relevant to the user based on a number of variables including things such as the user's location and what type of motors the user has in their garage.

There will be a weekly version the calendar that will show the events of that week 166. Tapping on one of these event items 167 will bring up a new view with details of that event 168. In this event detail view, the user can mark the event as attending 169, view the location of the event in their phone's map app 170, share the event in their newsfeed 171 or share the event to their messenger to another user 172.

The user can expand the calendar beyond the week-long view and see a month view 173 where the user can scroll between months and tap on a day 174 to the view that week's events.

The user may also create their own events 175. They may write a description of it 176, set the date 177, upload pictures 178, set the location 179, and send out invites 180 to other users and publish it to their newsfeed 181.

The user can tap on a navigation button to access the other views of the app 132.

Figure 16:
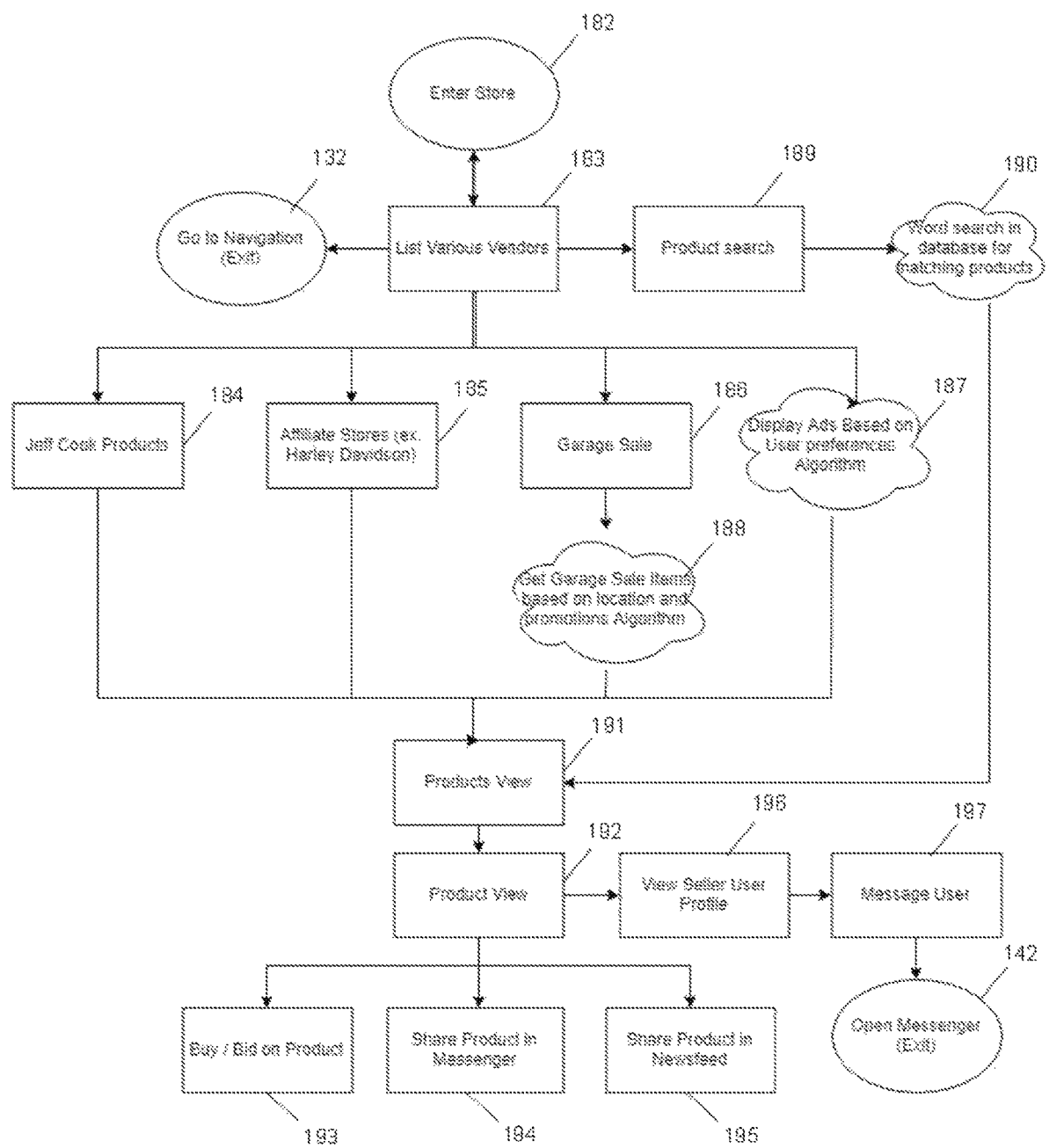

With reference to FIG. 16, entering the store view 182, the app will make a request to the server using the locally stored authorization token and load vendors deemed relevant to that user based on an algorithm. Vendors may include Jeff Cook™ products 184, affiliate store products 185 (ex. Harley Davidson™), user listed products from their Garage 186, and any ads for products as determined by a user preference algorithm 187. Tapping on these vendors will display their products in a new Products View 191.

The user may also search for products using a text search field 189. Searching would make a request to the server and query a database for relevant products based off the text search submitted by the user 190. These products will be show in a Products View 191.

Tapping on a product will show a product view 192 with the details, ratings, price, and user comments on that product. A user may buy the product or bid on the product if the user is auctioning it 193, share the product in messenger 194, or share the product to their newsfeed 195. The user may also tap on the seller and view the seller's user profile 196. They may message 197 the user which will open the Messenger view on a conversation with that user 142.

The user can tap on a navigation button to access the other views of the app 132.

Figure 17:
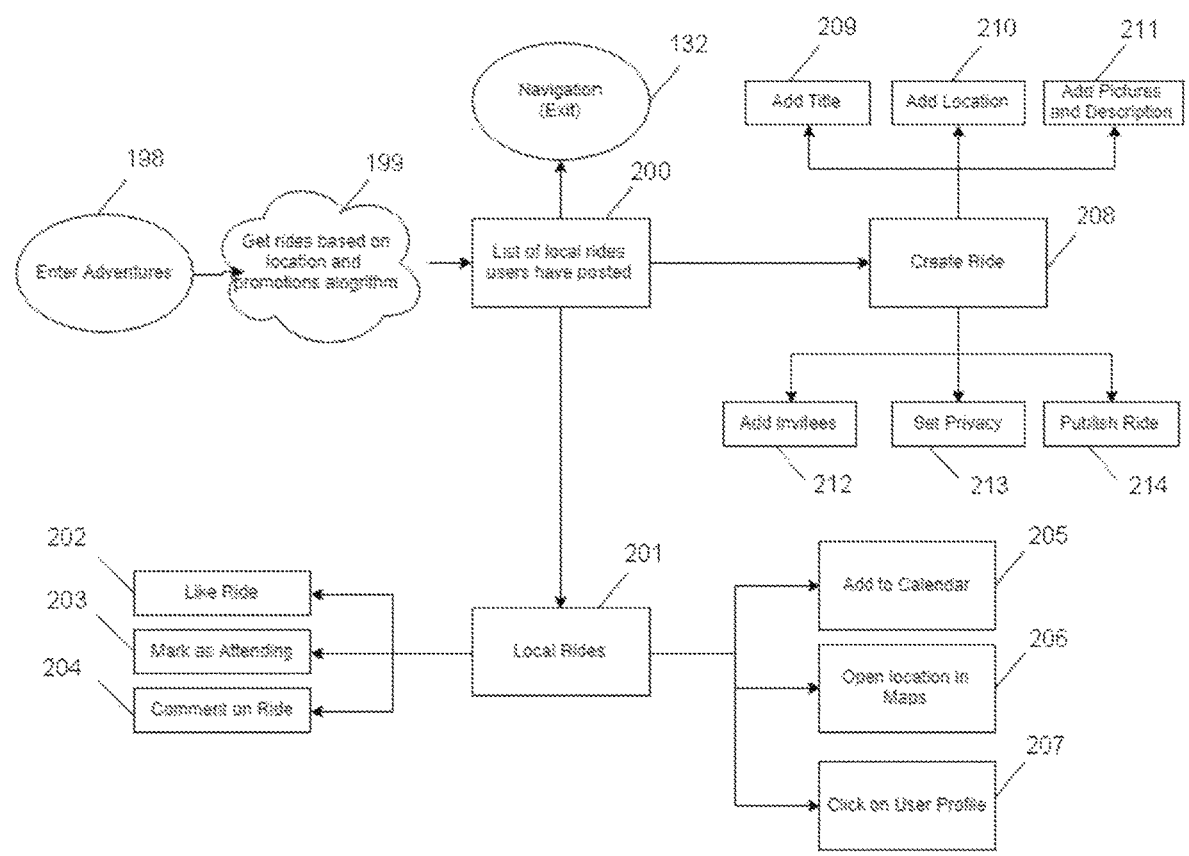

With reference to FIG. 17, entering the Adventures view 198, the app will make a request to the server using the locally stored authorization token to load local rides using the user's location and information based of the motor's they have in their garage 199. These rides will be in a vertical scrollable list 200.

Tapping on a ride will load a new local ride view 201 with details about that ride. The user can like the ride 202, mark it as attending 203, or comment on it 204. Taking any of these three actions will add this ride to the user's calendar. In addition to these interactions, the user can add the ride to their calendar manually 205, open the location of the ride in their device's map app 106, or click on the profile of the user who created the ride 207. This will load a profile view.

The user can tap a create ride button. This will open a create ride view 208 where the user can give it a title 209, location 210, pictures and a description 211. They can add users to send an invite to 212, set privacy settings 213, and publish the ride 214 for other users to find in their own Adventures view.

The user can tap on a navigation button to access the other views of the app 132.

Figure 18:
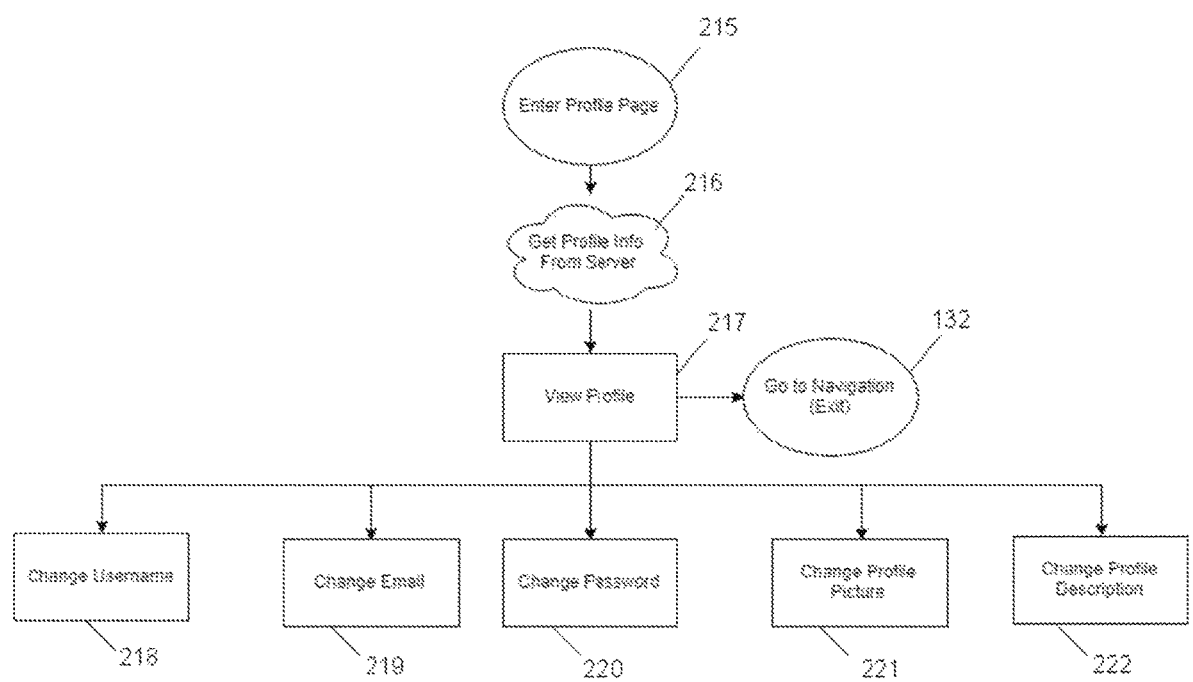

With reference to FIG. 18, entering the Profile view 215, the app will make a request to the server using the locally stored authorization token and retrieve the user's information 216 for display and updating by the user 217. The user will be able to change their username 218, update their email 219, change their password 220, upload a profile picture 221, and add a description to their profile 222.

The user can tap on a navigation button to access the other views of the app 132.

Figure 19:
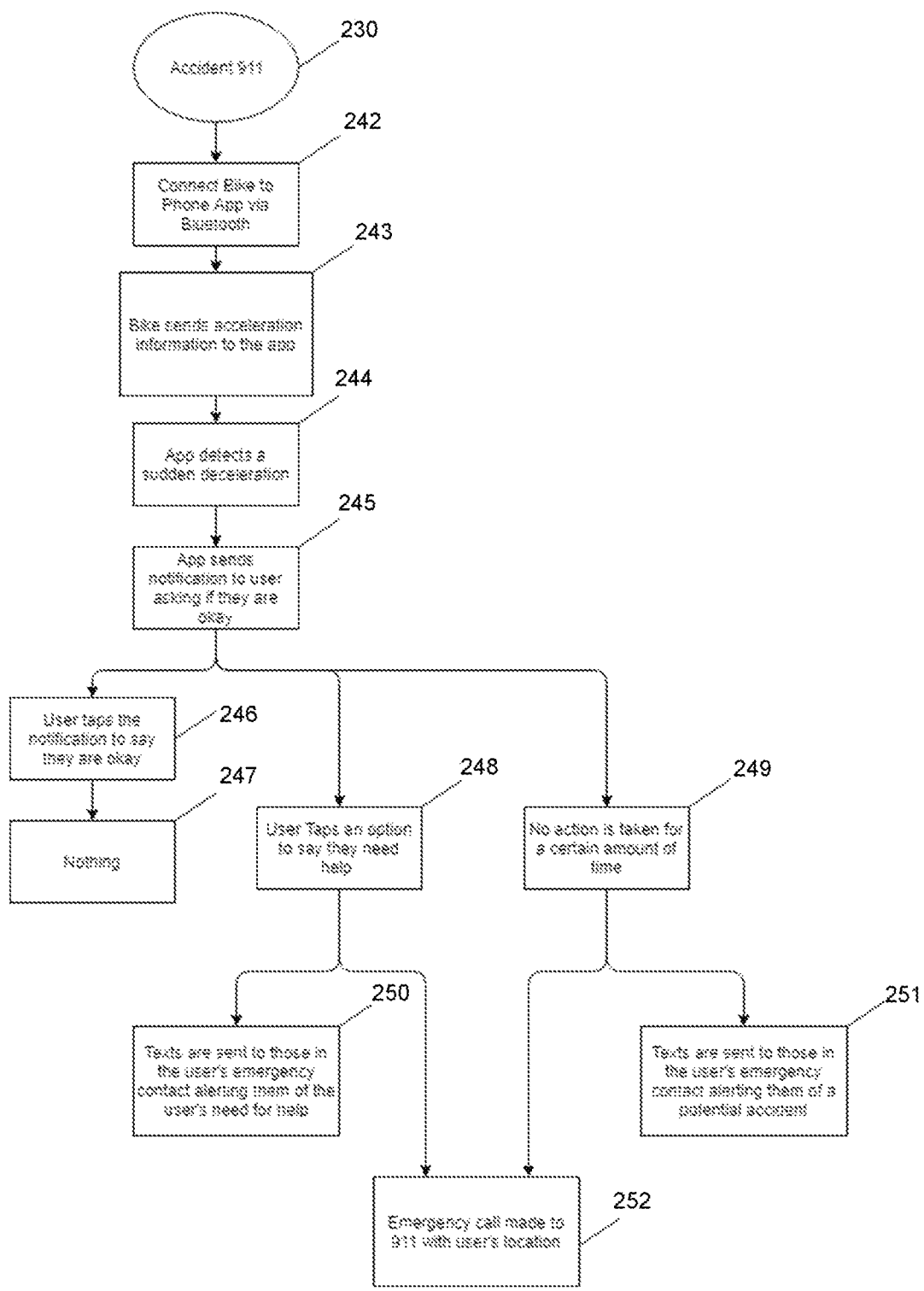

With reference to FIG. 19, the Accident 911 feature is enabled when the bike connects to the phone via a Bluetooth connection 242. During the connection the bike will send acceleration information to the app 243 for the purpose of detecting sudden decelerations which may imply the user got into an accident 244. In such instances, the app will send a notification prompt to the user to respond to, inquiring if the user is okay 245.

The user may tap on an option in the app that says the user is fine and nothing will happen 246, 247. The user may also tap that they need help 248 and texts will be sent out to emergency contacts 250 and an automated emergency call will be made to 911 with the user's location 252.

If no action is taken within a certain amount of time, the app will make text to emergency contacts that the user may be in a potential 251 accident and an emergency call will be made to 911 252.

Figure 20:
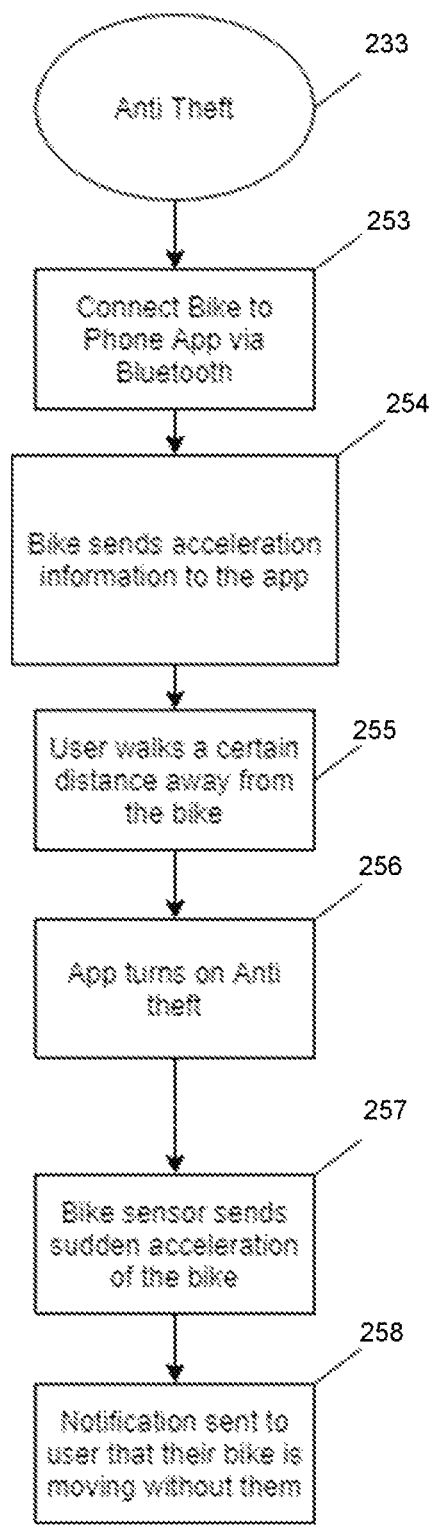

With reference to FIG. 20, the Anti-Theft (Bike or Helmet) feature is enabled when the bike or helmet is connected to the phone via a Bluetooth connect 253. During the connection, the bike or helmet will send acceleration information to the app 254. If the user walks a certain distance away from the bike or helmet, the app turns on the anti-theft feature 255, 256. If the bike or helmet sensor detects a sudden acceleration to the phone 257 a notification will be sent to the user's app that their bike or helmet is being disturbed.

Figure 21:
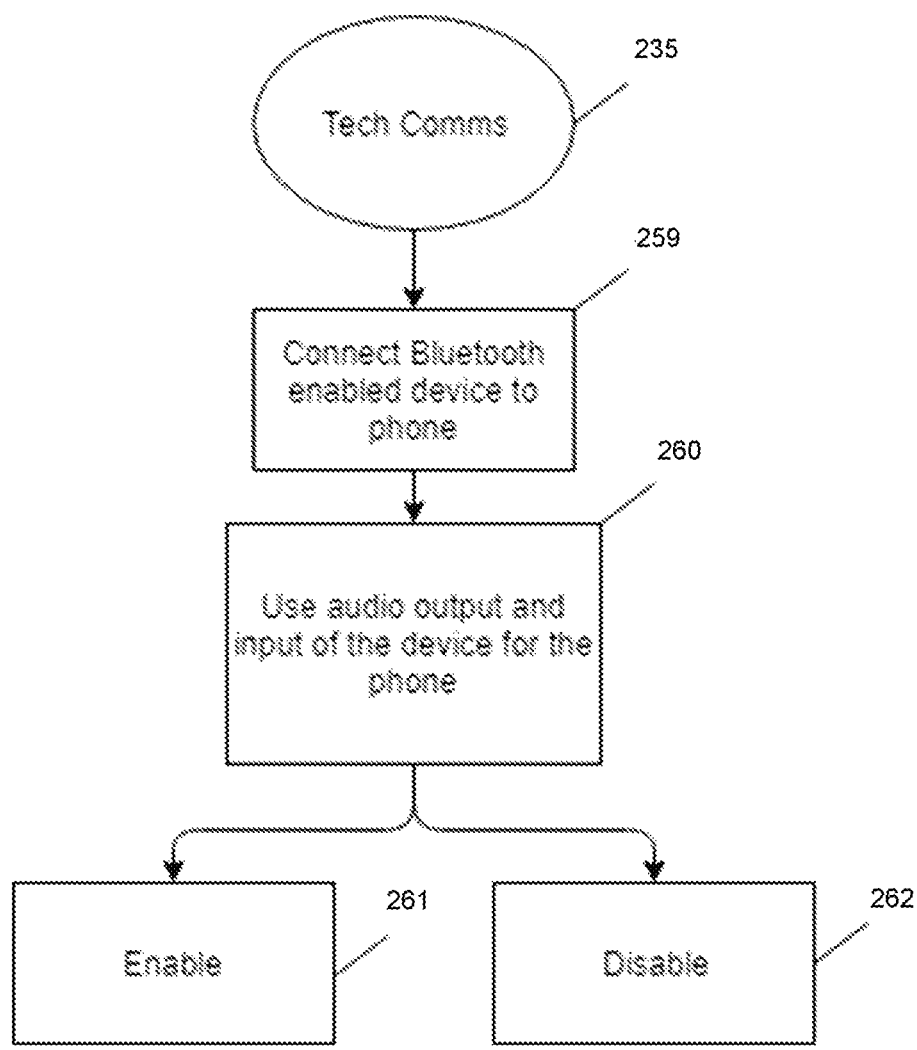

With reference to FIG. 21, the Comms feature is enabled when a communications device connects to the phone via a Bluetooth connection 259. Once connected the communications device will use both input and output channels of the phone for communication 260. The user may enable or disable it through the app 261, 262.

Figure 22:
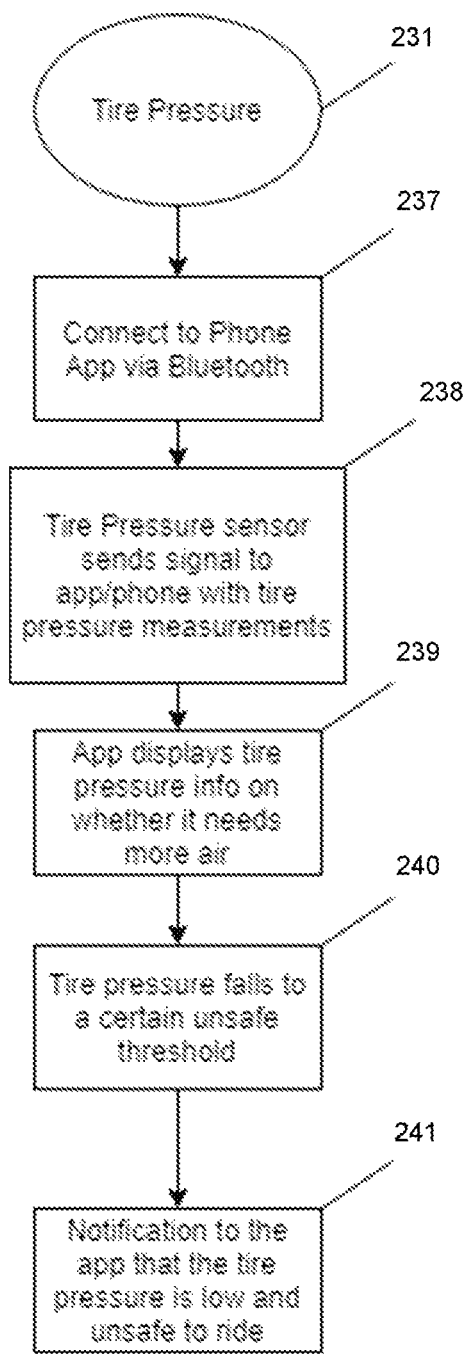

With reference to FIG. 22, the Tire Pressure feature is enabled when the tire pressure sensor is connected to the phone via a Bluetooth connection 237. The sensor sends tire pressure information to the app 238. The app lets the user know if they need to get more air in their tires 239. If the app detects that the tire pressure has gone below an unsafe threshold 240, a notification will be sent to the user about a safety concern 241.

Figure 23:
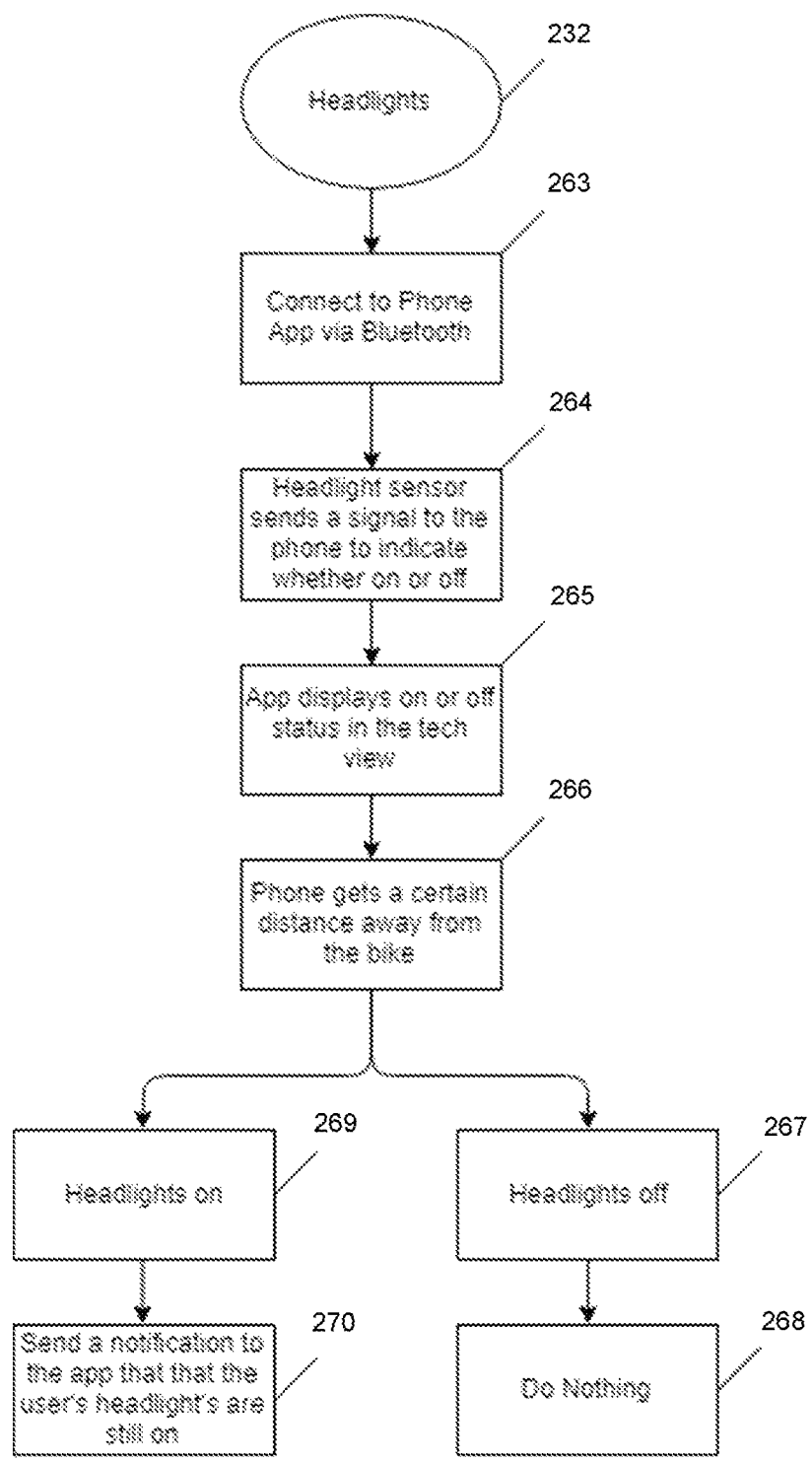

With reference to FIG. 23, the Headlights feature is enabled when a headlight sensor is connected to the phone via a Bluetooth connection 263. During the connection, headlight sensor will send information about the headlight being on or off to the phone 264. The app will indicate whether the headlight is on or off 265. If the user walks a certain distance away from the bike 266 while the headlights are still on, the user will get periodic notifications that their headlights are still on 269, 270.

Figure 24:
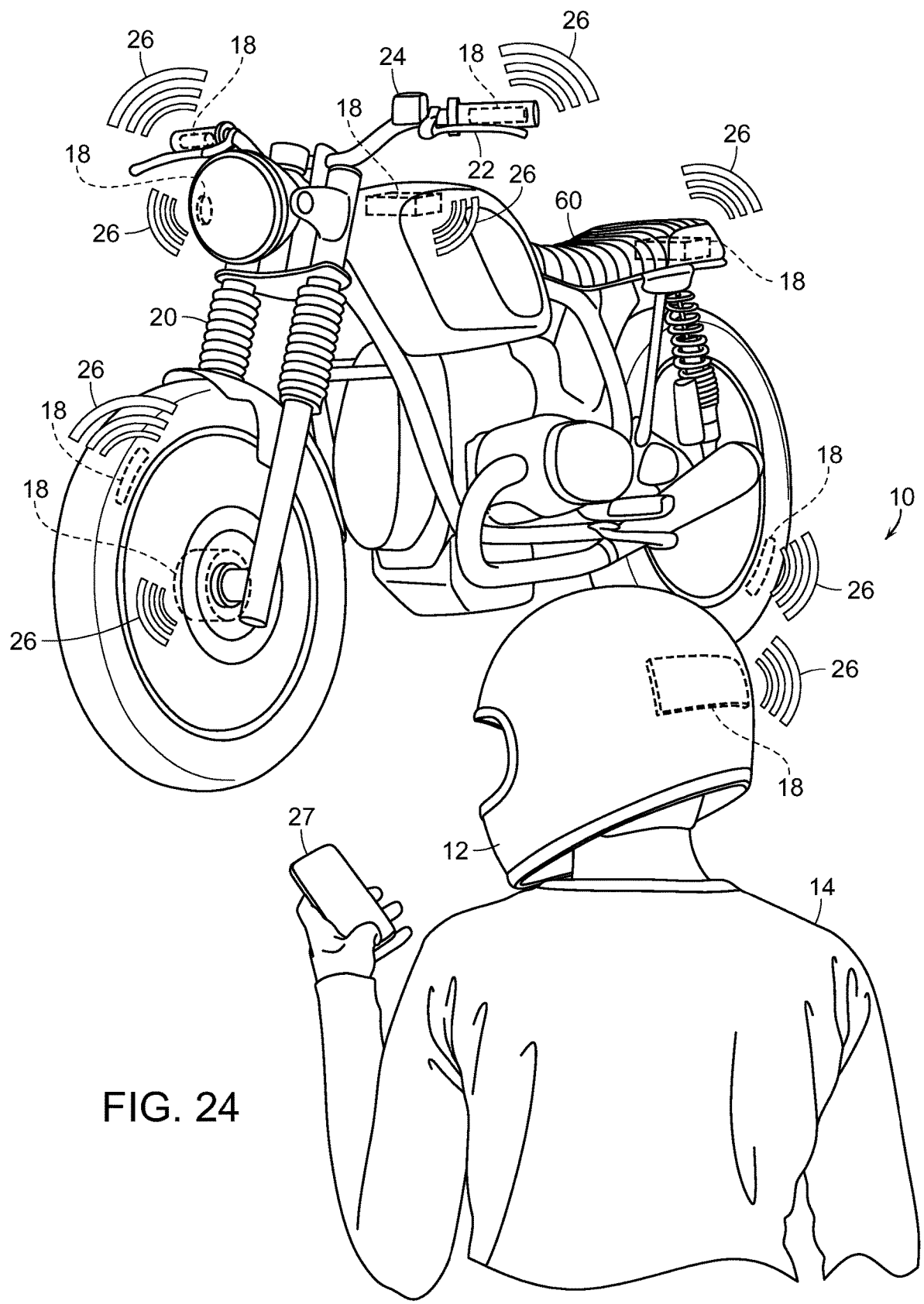
FIG. 24 is a perspective view of a motorcycle and a helmet on a motorcycle rider using the system and method of the present invention.

With reference now to FIG. 24, a perspective view of a motorcycle and a user 14 wearing a helmet 12, as described above is illustrated. However, in this case, additional sensors 18 are placed in the vehicle, typically a motorcycle 10, which emit wireless signals 26 received by a handheld device 27 of the user 14, such as a cellphone, smart phone or the like. For example, a sensor 18 may be associated with the headlight of the motorcycle. If the user turns off the motorcycle, or other vehicle but the headlight remains illuminated, a wireless signal 26 may provide a notification to the user 14, such as through handheld device 27 alerting the user that the headlight has been inadvertently powered on. This can avoid inadvertently draining the battery and also to avoid premature degradation of the headlamp.

Alternatively, a sensor 18 may be associated with the tires of the vehicle, such as the illustrated motorcycle 10, so as to monitor the status of the operation of the tires, such as an internal pressure of the tire. The sensor may be disposed within the tire and include a pressure sensor. A wireless signal 26 may be emitted and received by the portable handheld device 27 of the user to provide the user notifications of the status of the tires, including pressure status, such as when the pressure within the tires falls outside of a predetermined range.

One or more sensors 18 may also be associated with the vehicle itself, such as the motorcycle, and be capable of monitoring the movement or acceleration of the motorcycle 10. When the sensor detects a sudden deceleration of the motorcycle 10, the system and software may be configured so as to send a message or create a telephone call to predetermined emergency contacts in response to the vehicle's motion decrease. A user may cancel the notification in the event that it is a false alarm, such as the user merely stopping suddenly. However, in the event of an emergency, the message or telephone call may be automatically sent or created to the predetermined emergency contacts if the user does not cancel the notification within a predetermined period of time.

The motion sensors may also be able to detect motion of the vehicle, such as the illustrated motorcycle 10, when it is not intended that the motorcycle 10 be moving, such as when an anti-theft feature of the software running on the handheld device 27 is activated and the motion of the vehicle is detected when it is unanticipated, indicating theft of the vehicle 10. The helmet 12 may also incorporate a sensor 18 for this purpose to detect when the helmet 12 is in motion when it is unanticipated, indicating that the helmet 12 may be in the process of being stolen, whereby a wireless signal 26 may be transmitted and received by the handheld device 27 to alert the user of this. The alerts and notifications herein may be by audible sound emitted from the handheld device 27 and/or a notification displayed on the display of the handheld device.

Although several embodiments have been described in detail for purposes of illustration, various modifications may be made without departing from the scope and spirit of the invention. Accordingly, the invention is not to be limited, except as by the appended claims.

What is claimed is:

1. A method for monitoring a vehicle status, comprising the steps of:
   detecting a status of a headlight of a vehicle, including associating a sensor with the headlight of the vehicle which detects whether the headlight is illuminated;
   wirelessly transmitting a signal relating to the status of the headlight;
   receiving the signal on a portable handheld device; and
   notifying a user of the status of the headlight through the handheld device;
   wherein the notification is provided to the user through the handheld device when the headlight is illuminated and the vehicle is powered off.

2. The method of claim 1, wherein the notifying step comprises the step of emitting an audible sound notification from the handheld device or displaying a notification on a display of the handheld device.

3. A method for monitoring a vehicle status, comprising the steps of:
   detecting a status of motion of a vehicle or an associated helmet, including associating a motion sensor with the vehicle or a helmet associated with the vehicle that detects movement of the vehicle or helmet over time;
   wirelessly transmitting a signal relating to the status of the vehicle's or helmet's motion;
   receiving the signal on a portable handheld device; and
   notifying a user of the status of the motion through the handheld device under predetermined conditions;
   wherein a notification is provided to the user through the handheld device when the vehicle's motion decreases at least a predetermined amount over a predetermined time period, so as to indicate an accident.

4. The method of claim 3, wherein the notifying step comprises the step of emitting an audible sound notification from the handheld device or displaying a notification on a display of the handheld device.

5. The method of claim 3, including the step of a user cancelling the notification.

6. The method of claim 3, including the step of sending a message or creating a telephone call to predetermined emergency contacts in response to the vehicle's motion decrease.

7. The method of claim 6, including the step of automatically sending the message or creating the telephone call to the predetermined emergency contacts if the user does not cancel the notification within a predetermined period of time.

8. The method of claim 6, including the step of automatically sending the message or creating the telephone call to the predetermined emergency contacts if the user does not cancel the notification within a predetermined period of time.

9. A method for monitoring a vehicle status, comprising the steps of:
   detecting a status of motion of a vehicle or an associated helmet, including associating a motion sensor with the vehicle or a helmet associated with the vehicle that detects movement of the vehicle or helmet over time;
   wirelessly transmitting a signal relating to the status of the vehicle's or helmet's motion;
   receiving the signal on a portable handheld device; and notifying a user of the status of the motion through the handheld device when an anti-theft feature of software running on the handheld device is activated and motion of the vehicle or helmet is detected.

10. The method of claim 9, wherein the notifying step comprises the step of emitting an audible sound notification from the handheld device or displaying a notification on a display of the handheld device.

11. The method of claim 9, including the step of a user cancelling the notification.

12. The method of claim 9, including the step of sending a message or creating a telephone call to predetermined emergency contacts in response to the vehicle's motion.

* * * * *